US012614002B2

(12) United States Patent
Zhao et al.

(10) Patent No.: US 12,614,002 B2
(45) Date of Patent: Apr. 28, 2026

(54) SECURITY ISOLATION APPARATUS AND METHOD

(71) Applicant: Huawei Technologies Co., Ltd., Shenzhen (CN)

(72) Inventors: Junhua Zhao, Shenzhen (CN); Tianhong Ding, Hangzhou (CN); Yanlei Jia, Shenzhen (CN); Qiang Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 18/344,404

(22) Filed: Jun. 29, 2023

(65) Prior Publication Data

US 2023/0342503 A1 Oct. 26, 2023

Related U.S. Application Data

(63) Continuation of application No. PCT/CN2020/141102, filed on Dec. 29, 2020.

(51) Int. Cl.
*G06F 21/74* (2013.01)
*G06F 21/52* (2013.01)
*G06F 21/57* (2013.01)

(52) U.S. Cl.
CPC .............. *G06F 21/74* (2013.01); *G06F 21/52* (2013.01); *G06F 21/572* (2013.01)

(58) Field of Classification Search
USPC ........................................................ 726/26
See application file for complete search history.

(56) References Cited

U.S. PATENT DOCUMENTS

| | | | |
|---|---|---|---|
| 10,673,439 B1 | 6/2020 | Ahmad et al. | |
| 2009/0157936 A1* | 6/2009 | Goss ........................ | G06F 21/74 |
| | | | 713/300 |
| 2013/0212671 A1* | 8/2013 | Wang ...................... | G06F 21/70 |
| | | | 726/16 |
| 2015/0347328 A1* | 12/2015 | Dominguez ............ | G06F 9/544 |
| | | | 710/267 |
| 2019/0138736 A1* | 5/2019 | Campagna ............ | G06F 21/602 |
| 2019/0220602 A1* | 7/2019 | Ruan ...................... | G06F 21/64 |
| 2019/0318127 A1* | 10/2019 | Pan ........................ | G06F 21/60 |

FOREIGN PATENT DOCUMENTS

| | | | | | |
|---|---|---|---|---|---|
| CN | 104318182 A | * | 1/2015 | .......... | G06F 21/575 |
| CN | 109213638 A | * | 1/2019 | .......... | G06F 11/202 |
| EP | 3835988 A1 | | 6/2021 | | |

OTHER PUBLICATIONS

Shibahara, "Functional Safety SoC for Autonomous Driving," Apr. 2018, 2018 IEEE Custom Integrated Circuits Conference (CICC), pp. 1-8 (Year: 2018).*

* cited by examiner

*Primary Examiner* — Sakinah White Taylor

(74) *Attorney, Agent, or Firm* — Conley Rose, P.C.

(57) ABSTRACT

A system includes a first subsystem and a second subsystem that are used in a same chip. A security level of a first physical resource included in the first subsystem is higher than a security level of a second physical resource included in the second subsystem. The first subsystem includes an interrupt controller, and the interrupt controller is configured to manage an interrupt of a peripheral of the second subsystem. Embodiments of this application are for isolation between subsystems of different security levels in a chip.

20 Claims, 7 Drawing Sheets

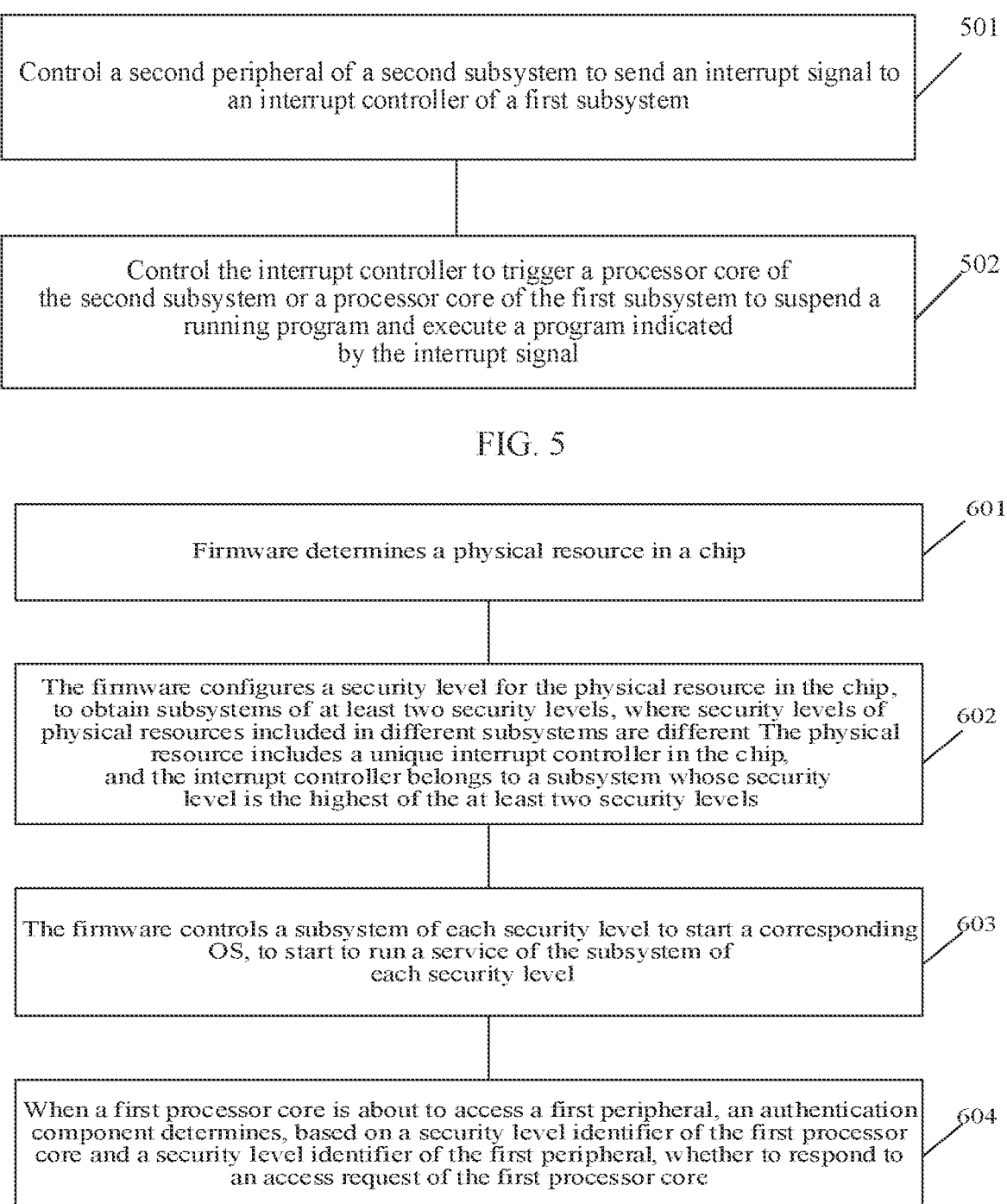

501

Control a second peripheral of a second subsystem to send an interrupt signal to an interrupt controller of a first subsystem

502

Control the interrupt controller to trigger a processor core of the second subsystem or a processor core of the first subsystem to suspend a running program and execute a program indicated by the interrupt signal

Firmware determines a physical resource in a chip

602

The firmware configures a security level for the physical resource in the chip, to obtain subsystems of at least two security levels, where security levels of physical resources included in different subsystems are different The physical resource includes a unique interrupt controller in the chip, and the interrupt controller belongs to a subsystem whose security level is the highest of the at least two security levels

603

The firmware controls a subsystem of each security level to start a corresponding OS, to start to run a service of the subsystem of each security level

604

When a first processor core is about to access a first peripheral, an authentication component determines, based on a security level identifier of the first processor core and a security level identifier of the first peripheral, whether to respond to an access request of the first processor core

FIG. 6

SECURITY ISOLATION APPARATUS AND METHOD

CROSS-REFERENCE TO RELATED APPLICATIONS

This is a continuation of International Patent Application No. PCT/CN2020/141102 filed on Dec. 29, 2020, the disclosure of which is hereby incorporated by reference in its entirety.

TECHNICAL FIELD

This application relates to the field of chip technologies, and in particular, to a security isolation apparatus and method.

BACKGROUND

In the autonomous driving field, high requirements on automotive safety integration level (ASIL) function safety need to be met. This field involves a complex system, and security levels that can be achieved by subsystems thereof may include a plurality of security levels such as ASIL-B and ASIL-D, or may further include a non-security level system like quality management (QM). ASIL-D indicates the highest level. QM indicates developing a system or function just according to the quality management system without considering any security-related design.

In order that different subsystems do not interfere with each other, resources occupied by the different subsystems need to be isolated. The resources may be, for example, accessible storage space or a core running the subsystems. At present, isolation between the different subsystems is mainly implemented through virtualization isolation, multi-die (die) packaging, combination of a plurality of system-on-a-chip (SoC), and redundancy degradation in the industry.

Isolation between the different subsystems implemented through the virtualization isolation technology is mainly based on a hypervisor virtualization solution. The Hypervisor can run a plurality of guest operating systems (OSs), and the plurality of guest OSs are run on a plurality of cores of different security levels. However, the Hypervisor-based virtualization technology has a risk of common cause failure caused by a single point of failure of the Hypervisor. As a result, the isolation process through guest OSs of different security levels is not completely implemented, and a security level of the entire solution is reduced. A solution in which a plurality of SoCs are combined to implement isolation between the different subsystems is generally implemented through a combination of a main SoC and a micro controller unit (MCU). The main SoC may process a service of an ASIL-B or QM level, and the MCU may process a service of an ASIL-D level. The main SoC may communicate with the MCU over a communication line. However, the main SoC and the MCU are two independent chips, and a main board circuit is complex, which increases a size, costs, and complexity of a main board. In addition, when the main SoC communicates with the MCU via an intermediate communication line, a risk of line disconnection is high, with reduced reliability and a low transmission speed of communication data.

SUMMARY

Embodiments of this application provide a security isolation apparatus and method. A problem of incomplete isolation between different subsystems in the field of autonomous driving is resolved, and cost of isolation is reduced.

To achieve the foregoing objectives, the following technical solutions are used in embodiments of this application.

A first aspect provides a security isolation apparatus, including a first subsystem and a second subsystem included in a same chip, where a security level of a first physical resource included in the first subsystem is higher than a security level of a second physical resource included in the second subsystem. The first subsystem includes an interrupt controller, where the interrupt controller is configured to manage an interrupt of a peripheral of the second subsystem. The peripheral of the second subsystem may be considered as a physical resource of the second subsystem, that is, a second physical resource.

In this application, two subsystems may be configured in a same chip: a first subsystem and a second subsystem. Security levels of physical resources included in different subsystems are different. In this application, a risk of common cause failure in the conventional technology caused by a single point of failure of the Hypervisor, resulting from isolation between the different subsystems implemented through the Hypervisor running a plurality of virtual guest OSs and the plurality of guest OSs being run on a plurality of cores of different security levels, can be avoided. That is, in this application, security levels may be directly configured for the physical resources of the different subsystems, to obtain subsystems of different security levels. In addition, the interrupt controller is provided in the first subsystem of a high security level, and the interrupt controller manages an interrupt of a peripheral of a low security level. In this way, the security level of the interrupt controller is set to the high security level through implementing complete physical isolation deployment between the subsystems of different security levels, ensuring security in executing an interrupt process.

In a possible design, the peripheral of the second subsystem includes a second peripheral, where the second peripheral is configured to send an interrupt signal to the interrupt controller of the first subsystem. The interrupt controller is configured to control, when receiving the interrupt signal, a processor core of the second subsystem or a processor core of the first subsystem to suspend a running program and execute a program indicated by the interrupt signal. That is, when the second subsystem that does not include the interrupt controller triggers the interrupt, the second subsystem needs to send the interrupt signal to the subsystem of the high security level that includes the interrupt controller, and the interrupt controller in the subsystem of the high security level controls the processor core to run the program indicated by the interrupt signal. In this way, in a case in which the security level of the interrupt controller is high, the subsystem of a non-high security level cannot execute the interrupt randomly. The subsystem of the non-high security level needs assistance by the interrupt controller of the subsystem of the high security level to control the processor core to execute the interrupt. Therefore, the security of the interrupt can be ensured, and the security of the security isolation apparatus is also provided.

In a possible design, the first physical resource includes a first processor core, and the second physical resource includes an interrupt configuration register and a second processor core. The second processor core is further configured to write interrupt information into the interrupt configuration register, where the interrupt information includes an interrupt attribute of the interrupt signal sent by the second peripheral. The first processor core is configured to read the interrupt information from the interrupt configuration register, and configure the interrupt information in the interrupt controller, to enable the interrupt controller to control the processor core of the second subsystem or the processor core of the first subsystem to execute the program indicated by the interrupt signal sent by the second peripheral. To be specific, when the subsystem of the low security level needs to configure the interrupt controller, the subsystem of the low security level needs to request a configuration from the subsystem of the high security level that includes the interrupt controller. That is, in this application, when there are subsystems of a plurality of security levels, only the subsystem of the high security level can perform write access to the interrupt controller. If a subsystem of the non-high security level needs to configure an interrupt controller, the subsystem of the low security level needs assistance by the subsystem of the high security level to perform configuration of the interrupt controller, thereby improving the security of interrupt configuration.

In a possible design, the first processor core is further configured to obtain an interrupt configuration request from the interrupt configuration register to trigger the first processor core to read the interrupt information from the interrupt configuration register. For example, when receiving the interrupt configuration request, the first processor core suspends execution of the running program, and reads the interrupt information from the interrupt configuration register; determines a register address and a written value of the interrupt controller based on the interrupt information, where the written value indicates the interrupt information; and writes the written value into the register indicated by the register address of the interrupt controller, and then continues the execution of the running program. The interrupt configuration register may be a Mailbox. That is, when receiving the request for configuring the interrupt controller, the first processor core of the first subsystem of the high security level may suspend the running program, and configure the interrupt controller based on the interrupt information read from the Mailbox of the second subsystem. This manner of configuring the interrupt controller by the processor core of the high security level may improve the security for configuring the interrupt controller, and further improve the security of the chip in which the security isolation apparatus is located.

In a possible design, the first physical resource is configured as a first security level identifier, and the second physical resource is configured as a second security level identifier. That is, in this application, security level identifiers are configured for physical resources to distinguish physical resources of different security levels. This is equivalent to that in this application, the physical resources of different security levels are physically isolated, so that the physical resources of different security levels can be isolated.

In a possible design, the security isolation apparatus further includes an authentication component, the first physical resource includes the first processor core, and the second physical resource includes the second processor core. The authentication component is configured to perform an authentication on an access request initiated by the first processor core of the first subsystem or the second processor core of the second subsystem, and send the access request to a corresponding peripheral in the chip if the authentication succeeds. The authentication component in this application may be understood as a component that does not belong to any subsystem but can communicate with any subsystem. When a subsystem needs to access the physical resource of another subsystem, the authentication component need to be used for authentication. In this way, the access between subsystems is more secure. Only the access request that is successfully authenticated by the authentication component can be sent to the accessed subsystem.

In a possible design, the second physical resource includes the second peripheral. The first processor core is configured to send a first access request to the authentication component, where the first access request carries the first security level identifier and an address of the second peripheral to be accessed. The authentication component is configured to receive the first access request, obtain a second security level identifier of the second peripheral based on the address of the second peripheral that is carried by the first access request, perform authentication based on the first security level identifier and the second security level identifier, and forward the first access request to the second peripheral if the authentication succeeds.

Each physical resource of each subsystem is configured with a security level identifier. When a physical resource of a subsystem wants to access a physical resource of another subsystem, the security level identifier of the physical resource needs to be carried by the access request. The authentication component may perform authentication based on the security level identifier carried by the access request and the security level identifier of the accessed physical resource, to determine whether the access is allowed. In this way, the security of subsystems of different security levels can be ensured.

In a possible design, the authentication component is further configured to: determine, if a security level of the first processor core corresponding to the first security level identifier is higher than a security level of the second peripheral corresponding to the second security level identifier, that the authentication succeeds, where the first access request is a write request or a read request.

In other words, the processor core of the subsystem of the high security level that includes the interrupt controller may perform write access or read access on the peripheral of the subsystem of the low security level, thereby improving permission of the subsystem of the high security level.

In a possible design, the first physical resource includes the first peripheral. The second processor core is configured to send a second access request to the authentication component, where the second access request carries the second security level identifier and an address of the first peripheral to be accessed. The authentication component is configured to receive the second access request, obtain a first security level identifier of the first peripheral based on the address of the first peripheral that is carried by the second access request, perform authentication based on the first security level identifier and the second security level identifier, and forward the second access request to the first peripheral if the authentication succeeds.

Similar to the foregoing design, the authentication component may perform authentication based on the security level identifier carried by the access request and the security level identifier of the accessed physical resource, to determine whether the access is allowed. In this way, the security of subsystems of different security levels can be ensured.

In a possible design, the authentication component is further configured to determine, if a security level of the second processor core corresponding to the second security level identifier is lower than a security level of the first peripheral corresponding to the first security level identifier, and the second access request is a read request, that the authentication succeeds. That is, if the subsystem of the low security level needs to perform read access to the subsystem of the high security level, the authentication component may send the request from the subsystem of the low security level to the subsystem of the high security level, so that the subsystem of the low security level performs read access to the subsystem of the high security level. If the subsystem of the low security level needs to perform write access to the subsystem of the high security level, the authentication component determines that the authentication fails, that is, the subsystem of the low security level has no permission to perform write access to the subsystem of the high security level. In this way, higher security of the subsystem of the high security level can be ensured.

In a possible design, the first subsystem is configured to process a service of a first security level, and the second subsystem is configured to process a service of a second security level or a service of a non-security level, where the first security level is higher than the second security level, the first security level and the second security level are levels in an ASIL, and the non-security level is QM.

In a possible design, the interrupt controller is the only interrupt controller in the chip, that is, the interrupt controller controls the interrupt of all peripherals in the chip.

A second aspect provides a security isolation method, where the method is applied to a security isolation apparatus, the security isolation apparatus includes a first subsystem and a second subsystem included in a same chip, a security level of a first physical resource included in the first subsystem is higher than a security level of a second physical resource included in the second subsystem. The first subsystem includes an interrupt controller, where the interrupt controller is configured to manage an interrupt of a peripheral of the second subsystem. The method includes: The interrupt controller manages an interrupt of a peripheral of the second subsystem.

In a possible design, a second peripheral of the second subsystem sends an interrupt signal to the interrupt controller of the first subsystem. The interrupt controller controls, when receiving the interrupt signal, a processor core of the second subsystem or a processor core of the first subsystem to suspend a running program and execute a program indicated by the interrupt signal.

That is, when the subsystem of the low security level needs to trigger the interrupt, the subsystem of the low security level needs to send the interrupt signal to the subsystem of the high security level that includes the interrupt controller, and the subsystem of the high security level has permission to indicate the processor core to suspend the running program and execute an interrupt program. In this way, not only physical resources of subsystems of different security levels are isolated, but also the security of the interrupt is ensured.

In a possible design, the second physical resource includes a second processor core, and the first physical resource includes a first processor core. That the interrupt controller controls, when receiving the interrupt signal, a processor core of the second subsystem or a processor core of the first subsystem to suspend a running program and execute a program indicated by the interrupt signal includes: The interrupt controller sends the interrupt signal to the second processor core, and controls the second processor core to suspend the running program and execute the program indicated by the interrupt signal; or the interrupt controller sends the interrupt signal to the first processor core, and controls the first processor core to suspend the running program and execute the program indicated by the interrupt signal.

That is, when the second subsystem that does not include the interrupt controller triggers the interrupt, the second subsystem needs to send the interrupt signal to the subsystem of the high security level that includes the interrupt controller, and the interrupt controller in the subsystem of the high security level controls the processor core to run the program indicated by the interrupt signal. In this way, in a case in which the security level of the interrupt controller is high, the subsystem of a non-high security level cannot execute the interrupt randomly. The subsystem of the non-high security level needs assistance by the interrupt controller of the subsystem of the high security level to control the processor core to execute the interrupt. Therefore, the security of the interrupt can be ensured, and the security of the security isolation apparatus is also provided.

In a possible design, the second physical resource further includes an interrupt configuration register and a second processor core, and the first physical resource includes a first processor core. Before that the second peripheral of the second subsystem sends the interrupt signal to the interrupt controller of the first subsystem, the method further includes: The second processor core writes interrupt information into the interrupt configuration register, where the interrupt information includes an interrupt attribute of the interrupt signal sent by the second peripheral. The first processor core reads the interrupt information from the interrupt configuration register, and configures the interrupt information in the interrupt controller, to enable the interrupt controller to control the processor core of the second subsystem or the processor core of the first subsystem to execute the program indicated by the interrupt signal sent by the second peripheral.

To be specific, when the subsystem of the low security level needs to configure the interrupt controller, the subsystem of the low security level needs to request a configuration from the subsystem of the high security level that includes the interrupt controller. That is, in this application, when there are subsystems of a plurality of security levels, only the subsystem of the high security level can perform write access to the interrupt controller. If a subsystem of the non-high security level needs to configure an interrupt controller, the subsystem of the low security level needs assistance by the subsystem of the high security level to perform configuration of the interrupt controller, thereby improving the security of interrupt configuration.

In a possible design, that the first processor core reads the interrupt information from the interrupt configuration register includes: The first processor core obtains an interrupt configuration request from the interrupt configuration register, to trigger the first processor core to read the interrupt information from the interrupt configuration register. For example, when receiving the interrupt configuration request, the first processor core suspends execution of the running program, and reads the interrupt information from the interrupt configuration register. The first processor core determines a register address and a written value of the interrupt controller based on the interrupt information, where the written value indicates the interrupt information. The first processor core writes the written value into the register indicated by the register address of the interrupt controller. Then the first processor core is controlled to continue the execution of the running program.

The interrupt configuration register may be a Mailbox. That is, when receiving the request for configuring the interrupt controller, the first processor core of the first subsystem of the high security level may suspend the running program, and configure the interrupt controller based on the interrupt information read from the Mailbox of the second subsystem. This manner of configuring the interrupt controller by the processor core of the high security level may improve the security for configuring the interrupt controller, and further improve the security of the chip in which the security isolation apparatus is located.

In a possible design, the security level of the first physical resource and the security level of the second physical resource are configured in an initialization phase of a system of the chip, by using firmware for initializing the system of the chip. That is, the security level may be set before the chip is delivered from a factory. The firmware may perform, upon the chip runs, security level configuration on a physical resource in the chip.

In a possible design, the first physical resource is configured as a first security level identifier, and the second physical resource is configured as a second security level identifier. That is, in this application, security level identifiers are configured for physical resources to distinguish physical resources of different security levels. This is equivalent to that in this application, the physical resources of different security levels are physically isolated, so that the physical resources of different security levels can be isolated.

In a possible design, the security isolation apparatus further includes an authentication component, the first physical resource includes the first processor core, and the second physical resource includes the second processor core. The authentication component performs an authentication on an access request initiated by the first processor core of the first subsystem or the second processor core of the second subsystem. The authentication component is controlled to send the access request to a corresponding peripheral in the chip if the authentication succeeds. The authentication component in this application may be understood as a component that does not belong to any subsystem but can communicate with any subsystem. When a subsystem needs to access the physical resource of another subsystem, the authentication component need to be used for authentication. In this way, the access between subsystems is more secure. Only the access request that is successfully authenticated by the authentication component can be sent to the accessed subsystem.

In a possible design, the second physical resource includes the second peripheral, and that the authentication component performs an authentication on an access request initiated by the first processor core of the first subsystem or the second processor core of the second subsystem and the authentication component sends the access request to a corresponding peripheral in the chip if the authentication succeeds includes: The first processor core sends a first access request to the authentication component, where the first access request carries the first security level identifier and an address of the second peripheral to be accessed. The authentication component obtains the second security level identifier of the second peripheral based on the address of the second peripheral that is carried by the first access request, perform authentication based on the first security level identifier and the second security level identifier, and forward the first access request to the second peripheral if the authentication succeeds.

Each physical resource of each subsystem is configured with a security level identifier. When a physical resource of a subsystem wants to access a physical resource of another subsystem, the security level identifier of the physical resource needs to be carried by the access request. The authentication component may perform authentication based on the security level identifier carried by the access request and the security level identifier of the accessed physical resource, to determine whether the access is allowed. In this way, the security of subsystems of different security levels can be ensured.

In a possible design, that the authentication is performed based on the first security level identifier and the second security level identifier includes:

If a security level of the first processor core corresponding to the first security level identifier is higher than a security level of the second peripheral corresponding to the second security level identifier, the authentication is determined to succeed, where the first access request is a write request or a read request. In other words, the processor core of the subsystem of the high security level that includes the interrupt controller may perform write access or read access on the peripheral of the subsystem of the low security level, thereby improving a permission of the subsystem of the high security level.

In a possible design, the first physical resource includes the first peripheral, and that the authentication component performs an authentication on an access request initiated by the first processor core of the first subsystem or the second processor core of the second subsystem and the authentication component sends the access request to a corresponding peripheral in the chip if the authentication succeeds includes: The second processor core sends a second access request to the authentication component, where the second access request carries the second security level identifier and an address of the first peripheral to be accessed. The authentication component receives a second access request, obtains the first security level identifier of the first peripheral based on the address of the first peripheral that is carried by the second access request, perform authentication based on the first security level identifier and the second security level identifier, and forward the second access request to the first peripheral if the authentication succeeds.

Similar to the foregoing design, the authentication component may perform authentication based on the security level identifier carried by the access request and the security level identifier of the accessed physical resource, to determine whether the access is allowed. In this way, the security of subsystems of different security levels can be ensured.

In a possible design, that the authentication is performed based on the first security level identifier and the second security level identifier includes:

If a security level of the second processor core corresponding to the second security level identifier is lower than a security level of the first peripheral corresponding to the first security level identifier, and the second access request is a read request, the authentication is determined to succeed.

That is, if the subsystem of the low security level needs to perform read access to the subsystem of the high security level, the authentication component may send the request from the subsystem of the low security level to the subsystem of the high security level, so that the subsystem of the low security level performs read access to the subsystem of the high security level. If the subsystem of the low security level needs to perform write access to the subsystem of the high security level, the authentication component determines that the authentication fails, that is, the subsystem of the low security level has no permission to perform write access to the subsystem of the high security level. In this way, higher security of the subsystem of the high security level can be ensured.

In a possible design, the first subsystem processes a service of a first security level, and the second subsystem processes a service of a second security level or a service of a non-security level, where the first security level is higher than the second security level, the first security level and the second security level are levels in an automotive safety integration level ASIL, and the non-security level is quality management QM.

In a possible design, the interrupt controller is the only interrupt controller in the chip.

A third aspect provides a communication apparatus, where the communication apparatus includes the security isolation apparatus according to any one of the first aspect or the possible designs of the first aspect.

A fourth aspect provides a terminal device, where the terminal device includes the communication apparatus according to the third aspect.

BRIEF DESCRIPTION OF DRAWINGS

FIG. 5 is a schematic flowchart of a security isolation method according to an embodiment of this application;

FIG. 6 is a schematic flowchart of classification of subsystems of different security levels according to an embodiment of this application;

DESCRIPTION OF EMBODIMENTS

Figure 1:
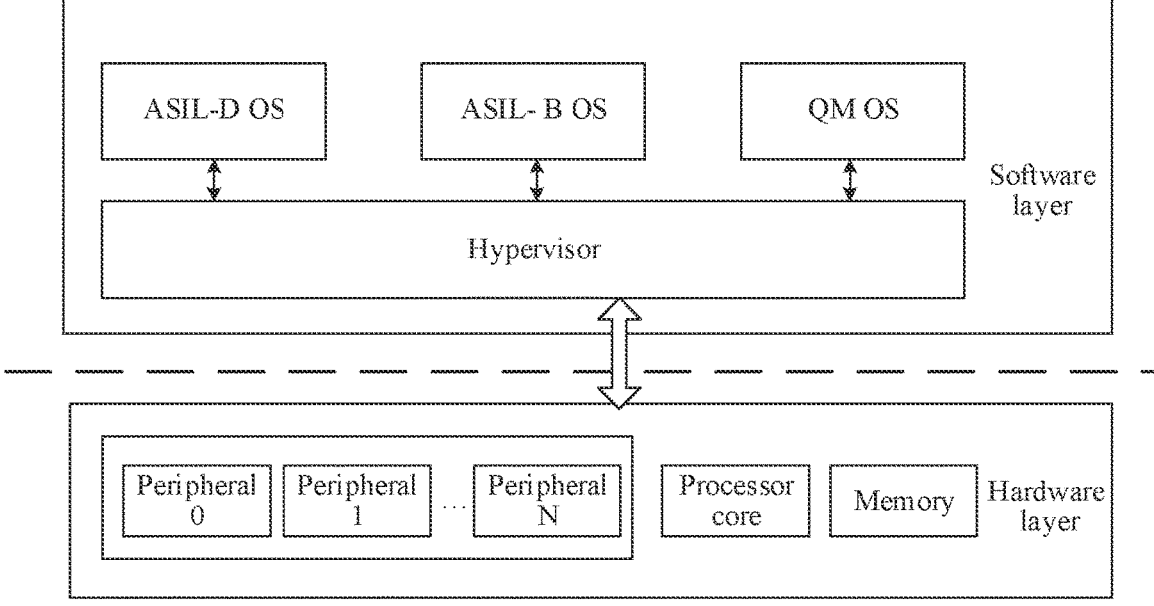
FIG. 1 is a schematic diagram of implementing isolation between different subsystems based on a Hypervisor virtualization technology according to an embodiment of this application.

The following describes embodiments of this application with reference to the accompanying drawings in embodiments of this application.

The terms "include", "have", and any other variant thereof in the specification, claims, and the accompanying drawings of this application, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a specific feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Some terms in this application are first described, so as to help a person skilled in the art have a better understanding.

Interrupt controller (IC): The IC is configured to obtain interrupts from external devices, prioritize the interrupts, and transfer the interrupts to respective processor cores. The IC is usually a hardware resource. In this application, the IC may be a generic interrupt controller (GIC) of an Advanced Reduced Instruction Set Computer (RISC) Machines (ARM), or may be an interrupt controller of another type. This is not limited in this application.

On-chip peripheral device: The on-chip peripheral device may be referred to as a peripheral for short, or may be referred to as an on-chip peripheral, and is an interface circuit and a bus that are on a chip and that are configured to connect to an off-chip peripheral device. The peripheral in this application is a peripheral on the chip, and the on-chip peripheral device in this application is referred to as the peripheral for short. In this application, a plurality of subsystems (for example, a first system and a second subsystem) included in the chip each includes a plurality of physical resources, and the peripheral is one of the physical resources.

Hypervisor: The Hypervisor is also referred to as a virtual machine monitor (VMM), and is configured to create and run software, firmware, or hardware of virtual machines. The computer used by the Hypervisor to run one or more virtual machines is referred to as a host machine. These virtual machines are referred to as guest machines. The Hypervisor provides a virtual operating platform to run guest operating systems. These guest operating systems share virtualized hardware resources.

In a field of autonomous driving, due to the complex system, not all subsystems and modules can achieve a high security level of ASIL-D. To achieve isolation between subsystems of different security levels, a plurality of isolation solutions are provided in the industry, for example, a conventional deployment solution of virtualization isolation and a deployment solution of combination of a plurality of SoCs of different levels.

The deployment solution of virtualization isolation implements isolation between different subsystems based on the Hypervisor virtualization technology. As shown in FIG. 1, a software layer of the solution may include a Hypervisor and a plurality of guest OSs. The guest OSs may include, for example, a plurality of virtual operating systems such as an ASIL-B OS, an ASIL-D OS, and a QM OS. Different guest OSs run on different virtual central processing units (CPUs). A hardware layer may include a plurality of peripherals, for example, a peripheral 0, a peripheral 1, and a peripheral N in FIG. 1, and further include a processor core, a memory, and the like. Details are as follows.

The Hypervisor runs on all processor cores, is capable of accessing all memories, and manages all external devices.

The Hypervisor can be configured to start the three guest OSs (ASIL-D OS, ASIL-B OS, and QM OS). Each guest OS can communicate with the public virtualized base Hypervisor and run independently based on the Hypervisor.

Different services can be deployed on each guest OS. Based on the security levels required by the services, ASIL-D services run on the ASIL-D OS, ASIL-B services run on the ASIL-B OS, and QM services run on the QM OS. The guest OSs are isolated with each other using the virtualization technology. Therefore, each guest OS is unaware of other guest OSs or the Hypervisor layer.

When a guest OS wants to access a peripheral, the guest OS first sends an access request to the Hypervisor. Then the Hypervisor accesses the real peripheral based on the access request and returns the access result to the guest OS.

However, in this isolation solution, although different guest OSs run on different virtual CPUs, the virtual CPUs may run on a same processor core. As a result, different guest OSs are not completely isolated. In addition, the Hypervisor manages all hardware resources, and does not distinguish the security levels of the hardware resources. Furthermore, although the plurality of guest OSs can run services of different security levels, there is only one Hypervisor. In this way, the guest OSs cannot be completely isolated in software, that is, the different security levels cannot be reflected in software, which reduces the overall security level of the Hypervisor. Moreover, the Hypervisor is a public base of respective guest OSs, there is still a risk of common cause failure caused by a single point of failure of the Hypervisor.

Figure 2:
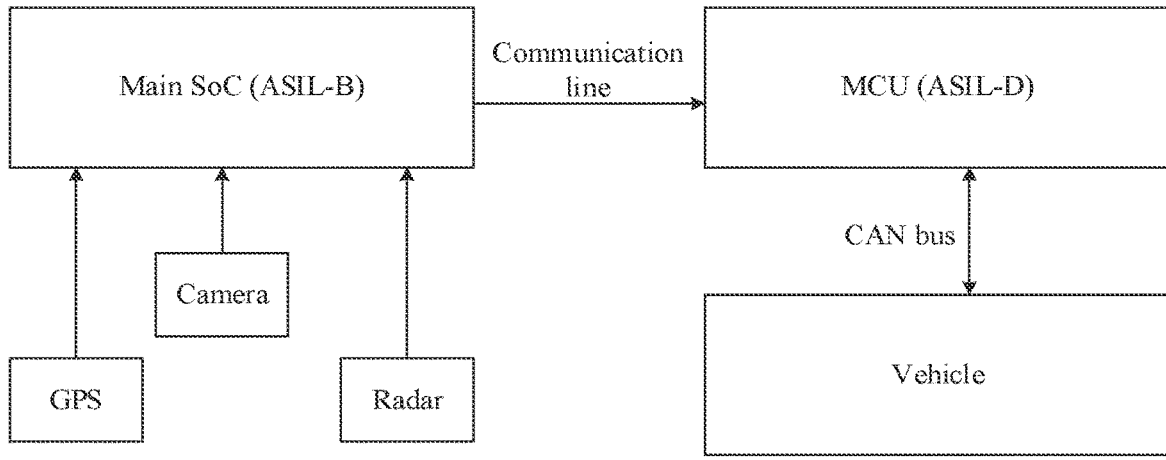
FIG. 2 is a schematic diagram of implementing isolation between different subsystems through a deployment solution of combination of a plurality of SoCs of different levels according to an embodiment of this application.

As shown in FIG. 2, the deployment solution of combination of a plurality of SoCs of different levels may be implemented through a chip architecture with a main SoC and an MCU. Details are as follows.

The main SoC may process a service of a relatively low security level, for example, process a service of a security level like ASIL-B or QM. For example, through the service of the security level like ASIL-B or QM, camera data is analyzed, various targets (such as a person, a non-motor vehicle, a motor vehicle, a traffic sign, and a traffic signal light) are identified from the camera data, and Global Positioning System (GPS) data and radar data are processed, and the like.

The MCU may be configured for a service of a relatively high security level, for example, processing a service of a security level of ASIL-D. For example, the MCU may receive vehicle data via a Controller Area Network (CAN) bus. In addition, the MCU may send instructions to a motor vehicle via the CAN bus, to control the motor vehicle (for example, the instruction indicates acceleration, deceleration, braking, turning, and the like).

The main SoC may communicate with the MCU via a communication line, like a serial peripheral interface (SPI) bus or an inter-integrated circuit (IIC) bus. The main SoC may send detection results such as the foregoing various targets, GPS data, and radar data to the MCU via the communication line, and the MCU sends a control command to the motor vehicle based on the detection result.

Because the main SoC and the MCU are two independent chips, a main board circuit of the chip is relatively complex, and costs are relatively high. In addition, when the main SoC communicates with the MCU via an intermediate communication line, a risk of a communication line fault is relatively high, and a transmission speed of communication data is relatively low.

Therefore, to resolve the foregoing problem, this application provides a solution for implementing hybrid deployment of systems of different security levels based on physical isolation in a single SoC. The solution is applied to a scenario that has both a requirement for computing and processing of a large amount of complex data and a requirement for a high function security level, for example, aviation, railway, ship, drone, automation, advanced industrial control, industrial robot, and autonomous driving system based on data receiving and processing of various complex sensors, neural network intelligent computing, or large data computing. In particular, the solution is applied to a field in which there are a plurality of services of different security levels, such as assisted driving and autonomous driving.

Figure 3:
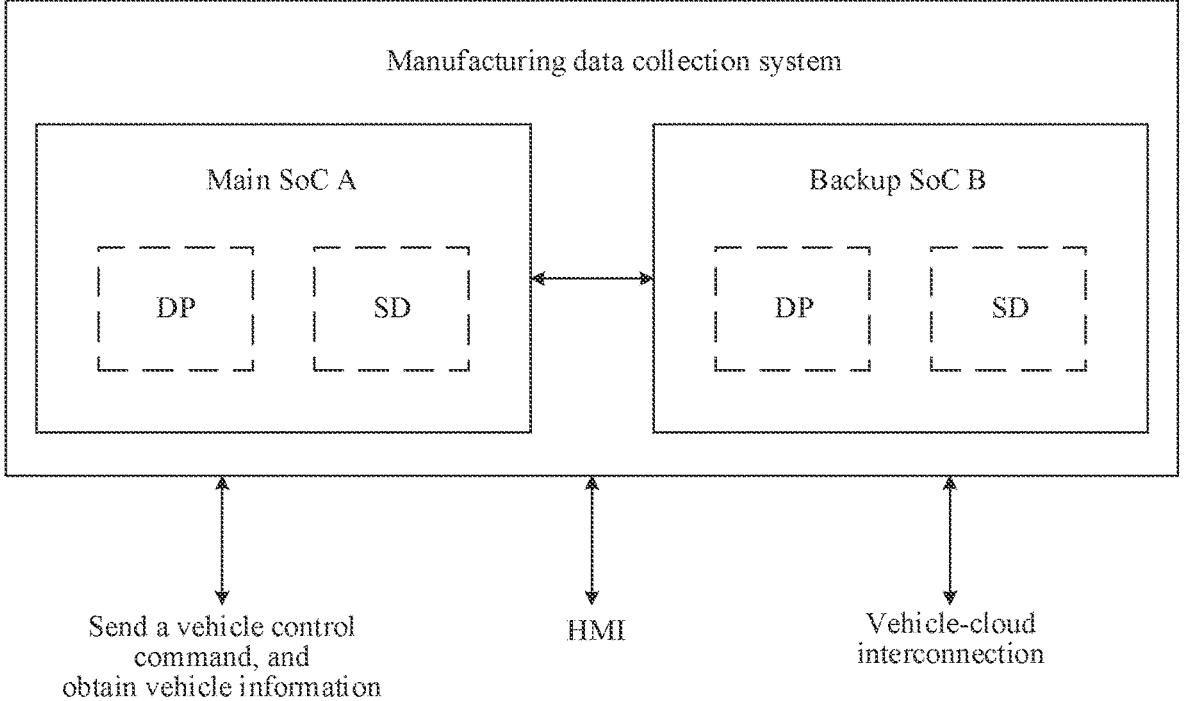
FIG. 3 is a schematic diagram of a manufacturing data collection (MDC) system in the autonomous driving field according to an embodiment of this application.

In the autonomous driving field, as shown in FIG. 3, a motor vehicle that can perform autonomous driving may include a MDC system, which may be generally referred to as a machine tool monitoring and data collection system. The MDC system may send a vehicle control command to the motor vehicle and obtain vehicle information. The MDC system may also perform human machine interface (HMI) with the motor vehicle. The MDC system may further communicate with the cloud server to implement interconnection between the vehicle and cloud.

The MDC system may include a main SoC and a backup SoC, for example, a main SoC A and a backup SoC B in FIG. 3. Processes such as main/backup synchronization and interconnection, exception information synchronization, and main/backup negotiation may be performed between the main SoC A and the backup SoC B. Both the main SoC and the backup SoC include a safety driving (SD) system and a data processing (DP) system. Generally, the SD system is configured to run the service of the relatively high security level, for example, run the service of the ASIL-D security level. The DP system is configured to run the service of the relatively low security level, for example, run the service of the ASIL-B security level and the QM service. This application is applicable to perform physical isolation between the SD system and the DP system in a single SoC. For example, physical isolation between the SD system and the DP system in a main SoC A is performed, or physical isolation between the SD system and the DP system in a backup SoC B is performed, to implement physical isolation between systems of a plurality of security levels in a single SoC. This application may be further applicable to physical isolation between systems of the plurality of security levels in the single SoC in another scenario.

Therefore, in the solution of performing physical isolation on systems of different security levels, this application provides a method for implementing physical isolation between subsystems in a single chip. This application provides a security isolation apparatus. The security isolation apparatus may be used in a plurality of subsystems of a same chip. A plurality of security levels are configured for physical resources of the plurality of subsystems, where a security level of a first physical resource included in one subsystem is higher than a security level of a physical resource included in any other subsystem. In other words, the subsystem including the first physical resource has a highest security level. In addition, in this application, the subsystem including the first physical resource includes the only interrupt controller in the chip, and the interrupt controller is configured to manage an interrupt of a peripheral in the chip. It may be understood that, in this application, physical isolation between systems may be performed by configuring different security levels for physical resources in the single chip. In this way, not only high security isolation between physical resources can be implemented, but also physical resources of different subsystems in this application are integrated in the single chip, thereby reducing costs of isolation between systems. In this application, the interrupt controller is further configured in the subsystem of the highest security level such as to ensure high security when the chip executes an interrupt.

Figure 4:
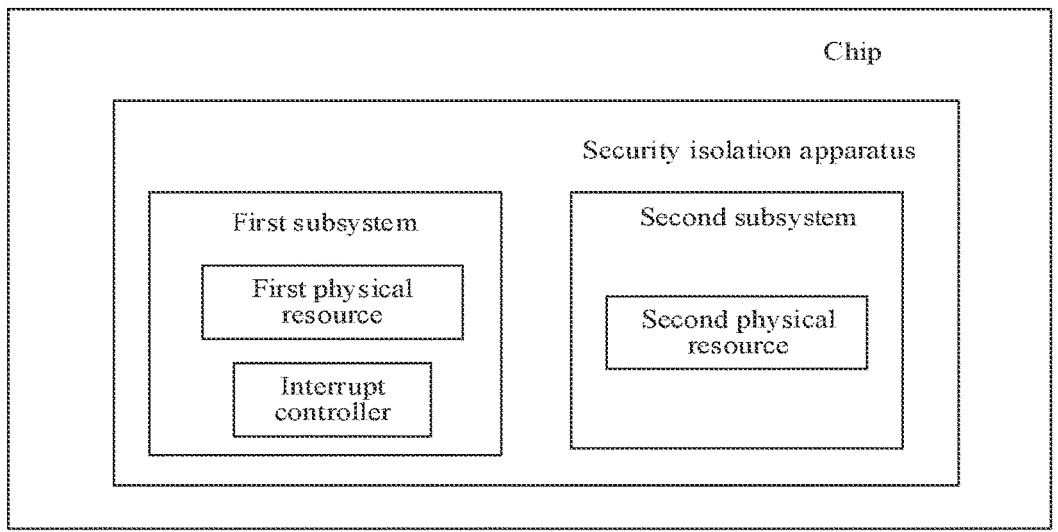
FIG. 4 is a schematic structural diagram of a security isolation apparatus according to an embodiment of this application.

In some embodiments, as shown in FIG. 4, the security isolation apparatus in this application is used in a first subsystem and a second subsystem of a same chip. A security level of a first physical resource included in the first subsystem is higher than a security level of a second physical resource included in the second subsystem.

The first subsystem includes an interrupt controller, and the interrupt controller is configured to manage an interrupt of a peripheral of the second subsystem.

In some embodiments, the interrupt controller is the only interrupt controller in the chip. That is, although the interrupt controller belongs to the first subsystem, the interrupt controller may control interrupts of peripherals including those of the first subsystem and the second subsystem.

In some embodiments, in this application, physical resources of the plurality of security levels may be obtained by configuring a plurality of security level identifiers for each physical resource in the chip, and subsystems of a same security level include physical resources of a same security level identifier. For example, the first physical resource is configured as a first security level identifier, the second physical resource is configured as a second security level identifier, where a security level of a physical resource identified by the first security level identifier is higher than a security level of a physical resource identified by the second security level identifier.

According to the foregoing configuration of the security level identifier, the physical resource of the chip includes the only interrupt controller globally in the chip, and the interrupt controller is configured, through the configuration of the security level identifier, to belong to the subsystem whose security level is the highest of the at least two security levels. This means that there is only one interrupt controller in the entire single chip, and the interrupt controller is located in the subsystem of the highest security level, and may be configured to manage all peripheral interrupts of different security levels in the chip. This is an important hardware resource for the entire system. Therefore, in this application, the interrupt controller is classified into the subsystem of the highest security level. An interrupt controller cannot be directly configured for a subsystem of another security level lower than the highest security level, and the configuration needs to be relayed through the subsystem of the high security level. That is, the subsystem of the high security level assists the subsystem of the other security level to configure the interrupt controller. In this way, the security level of the interrupt controller is set to the highest security level through implementing complete physical isolation deployment between the subsystems of different security levels, further ensuring security in executing an interrupt process.

In this application, the physical resource in the chip is classified into the first subsystem and the second subsystem based on different security levels. In some embodiments, it is assumed that the second physical resource includes the second peripheral. If the second peripheral needs to trigger the interrupt: the second peripheral may be configured to send an interrupt signal to the interrupt controller of the first subsystem; and the interrupt controller is configured to control, when receiving the interrupt signal, a processor core of the second subsystem or a processor core of the first subsystem to suspend a running program and execute a program indicated by the interrupt signal.

That is, when the second peripheral in the second subsystem of a low security level needs to trigger the interrupt, the second peripheral needs to send the interrupt signal to the interrupt controller in the first subsystem of a high security level. The interrupt controller indicates the processor core of the first subsystem or the processor core of the second subsystem to execute the program indicated by the interrupt signal.

It should be noted that, when the interrupt controller receives the interrupt signal, the specific program for determining which processor core executes the program indicated by the interrupt signal may be pre-configured in the interrupt controller. The interrupt controller may indicate, based on the pre-configuration, the processor core to execute the program indicated by the interrupt signal.

In some embodiments, before any peripheral triggers an interrupt, an interrupt attribute of the triggered interrupt needs to have been configured in the interrupt controller, so that the interrupt controller can trigger the interrupt based on the configuration. Therefore, before the second peripheral sends the interrupt signal, it is assumed that the first physical resource includes a first processor core, and the second physical resource further includes an interrupt configuration register (for example, may be understood as a Mailbox) and a second processor core.

In this case, the second processor core is further configured to write interrupt information into the interrupt configuration register, where the interrupt information includes an interrupt attribute of the interrupt signal sent by the second peripheral. Each peripheral may correspond to a plurality of interrupt attributes. For each interrupt attribute, before the interrupt attribute is configured in the interrupt controller, the second processor core needs to write information such as the interrupt attribute and an interrupt priority into the Mailbox. After completing interrupt configuration of an interrupt attribute of a peripheral, if interrupt configuration needs to be performed for other interrupt attributes of the peripheral, the second processor core may write interrupt information corresponding to the interrupt attribute to be configured this time into the Mailbox, and the interrupt information written previously in the Mailbox is overwritten.

The first processor core is configured to read the interrupt information from the interrupt configuration register and configure the interrupt information in the interrupt controller. That is, the first processor core of the first subsystem assists the second peripheral of the second subsystem to configure the interrupt controller. In this way, the interrupt controller may control the processor core of the second subsystem or the processor core of the first subsystem to execute the program indicated by the interrupt signal sent by the second peripheral.

For example, after the interrupt information is written into the interrupt controller, the first processor core may be configured to obtain an interrupt configuration request from the interrupt configuration register, to trigger the first processor core to read the interrupt information from the interrupt configuration register. Alternatively, the processor core of the second subsystem may send an interrupt configuration request to the interrupt controller through the interrupt configuration register, where the interrupt configuration request requests the interrupt controller to perform interrupt configuration for the interrupt attribute of the second peripheral. The interrupt controller may send, based on the pre-configuration, the interrupt configuration request to the first processor core that can execute the interrupt configuration such that the first processor core reads the interrupt information from the interrupt configuration register.

When the first processor core receives the interrupt configuration request, for example, the first processor core may be further configured to perform the following operations.

The first processor core may be further configured to suspend the running program and read the interrupt information from the interrupt configuration register.

The first processor core may be further configured to determine, based on the interrupt information, a register address and a written value of the interrupt controller. The written value indicates the interrupt information. It may be understood that the interrupt controller includes a plurality of registers. When the interrupt attribute needs to be configured, the first processor core may determine, based on the read interrupt information, which register of the interrupt controller stores information corresponding to the interrupt attribute. The written value may be understood as information in another format after the format of the interrupt information is converted.

The first processor core may be further configured to write the written value into the register indicated by the register address of the interrupt controller, and then continue to execute the running program. When the first processor core writes the written value into the register indicated by the register address of the interrupt controller, interrupt configuration of the interrupt attribute is achieved in the interrupt controller. In this case, the second processor core may read the written value from the interrupt controller. If the read written value matches the configured interrupt attribute of the second peripheral, the second processor determines that the interrupt configuration is successful; or the interrupt controller may send an interrupt configuration success indication to the second processor core such that the second processor core may perform interrupt configuration of a next interrupt attribute.

In some embodiments, to ensure the security of the subsystem of the high security level, the security isolation apparatus in this application may further include an authentication component. It is assumed that the first physical resource includes the first processor core, and the second physical resource includes the second processor core. The authentication component may be configured to: perform an authentication on an access request initiated by the first processor core of the first subsystem or the second processor core of the second subsystem, and send the access request to a corresponding peripheral in the chip if the authentication succeeds.

The authentication rule followed by the authentication component herein may be: The subsystem of the high security level may perform read access and write access to the subsystem of the low security level, the subsystem of the low security level may perform read access to the subsystem of the high security level, but the subsystem of the low security level cannot perform write access to the subsystem of the high security level. In this way, the security of the subsystem of the high security level is higher, and the subsystem of the low security level cannot randomly perform write access to the subsystem of the high security level, thereby ensuring the security of the subsystem of the high security level. The authentication component in this application may be understood as a component that does not belong to any subsystem.

As described above, in this application, security level identifiers of corresponding security levels are configured for the physical resources of the different subsystems. Therefore, when performing authentication, the authentication component may further determine, based on a security level identifier of a physical resource to be accessed and a security level identifier of a physical resource being accessed, whether the authentication succeeds.

For example, if the first subsystem needs to access the second subsystem, and it is assumed that the first physical resource includes the first processor core, and the second physical resource includes the second peripheral: the first processor core is configured to send a first access request to the authentication component, where the first access request carries the first security level identifier and an address of the second peripheral to be accessed; and the authentication component is configured to receive the first access request, obtain a second security level identifier of the second peripheral based on the address of the second peripheral that is carried by the first access request, perform authentication based on the first security level identifier and the second security level identifier, and forward the first access request to the second peripheral if the authentication succeeds.

The authentication component may be further configured to: if it is determined, based on the first security level identifier and the second security level identifier, that the security level of the first processor core corresponding to the first security level identifier is higher than the security level of the second peripheral corresponding to the second security level identifier, determine that the authentication succeeds, where the first access request is a write request or a read request.

For another example, if the second subsystem needs to access the first subsystem, and it is assumed that the first physical resource includes a first peripheral, and the second physical resource includes the second processor core: the second processor core is configured to send a second access request to the authentication component, where the second access request carries the second security level identifier and an address of the first peripheral to be accessed; and the authentication component is configured to receive the second access request, obtain a first security level identifier of the first peripheral based on the address of the first peripheral that is carried by the second access request, perform authentication based on the first security level identifier and the second security level identifier, and forward the second access request to the first peripheral if the authentication succeeds.

The authentication component may be further configured to: if it is determined, based on the first security level identifier and the second security level identifier, that the security level of the second processor core corresponding to the second security level identifier is lower than the security level of the first peripheral corresponding to the first security level identifier, and the second access request is a read request, determine that the authentication succeeds, or on the contrary, if the second access request is a write request, determine that the authentication fails.

In some embodiments, the security isolation apparatus may be applied to a driving scenario. In this scenario, the first subsystem may be configured to process a service of a first security level, and the second subsystem may be configured to process a service of a second security level or a service of a non-security level, where the first security level is higher than the second security level, the first security level and the second security level are levels in an ASIL, and the non-security level is QM. In this way, high security of the service of the first security level in the driving scenario can be ensured.

Therefore, according to the foregoing description, in one aspect of this application, the interrupt controller is configured to belong to the subsystem of the high security level. If a subsystem of another security level needs to perform interrupt configuration, the subsystem needs to request interrupt configuration from the subsystem of the high security level, and the subsystem of the high security level assists the subsystem of the another security level to configure the interrupt controller. When a peripheral of the subsystem of the another security level triggers an interrupt, the peripheral needs to request the interrupt controller of the subsystem of the high security level to trigger the interrupt, and the interrupt controller then indicates the processor core to execute an interrupt program. In this way, high security of the interrupt controller can be ensured, and security of the subsystem of the high security level is also ensured. In another aspect, the authentication component in this application can implement that the subsystem of the high security level can perform read access or write access to the subsystem of the another security level, and the subsystem of the low security level can only perform read access to the subsystem of the high security level, so that security of the high security level can be ensured.

Corresponding to the security isolation apparatus provided in this application, this application further provides a security isolation method, which may be applied to a first subsystem and a second subsystem of a same chip. A security level of a first physical resource included in the first subsystem is higher than a security level of a second physical resource included in the second subsystem. The first subsystem includes an interrupt controller, where the interrupt controller is configured to manage an interrupt of a peripheral of the second subsystem. As shown in FIG. 5, the method includes the following steps:

501: Control the second peripheral of the second subsystem to send an interrupt signal to the interrupt controller of the first subsystem.

502: Control the interrupt controller to trigger a processor core of the second subsystem or a processor core of the first subsystem to suspend a running program and execute a program indicated by an interrupt signal.

In some embodiments, it is assumed that the second physical resource further includes a second processor core, and the first physical resource further includes a first processor core. An implementation of step 502 may be: the interrupt controller is controlled to send the interrupt signal to the second processor core, and the second processor core is controlled to suspend the running program and execute the program indicated by the interrupt signal; or the interrupt controller is controlled to send the interrupt signal to the first processor core, and the first processor core is controlled to suspend the running program and execute the program indicated by the interrupt signal.

Before the second peripheral triggers the interrupt, an interrupt attribute of the triggered interrupt needs to be configured in the interrupt controller first, so that the interrupt controller can trigger the processor core to execute an interrupt program. Therefore, it is assumed that the second physical resource includes an interrupt configuration register and the second processor core, and the first physical resource includes the first processor core.

Before that the second peripheral of the second subsystem is controlled to send an interrupt signal to the interrupt controller of the first subsystem, the method further includes:

The second processor core is controlled to write interrupt information into the interrupt configuration register, where the interrupt information includes an interrupt attribute of the interrupt signal sent by the second peripheral.

The first processor core is controlled to read the interrupt information from the interrupt configuration register, and configure the interrupt information in the interrupt controller, to enable the interrupt controller to control the processor core of the second subsystem or the processor core of the first subsystem to execute the program indicated by the interrupt signal sent by the second peripheral.

For example, the first processor core may be controlled to obtain an interrupt configuration request from the interrupt configuration register, to trigger the first processor core to read the interrupt information from the interrupt configuration register.

Alternatively, the second processor core may be controlled to generate the interrupt configuration request based on the interrupt information, the second processor core may be controlled to send the interrupt configuration request to the interrupt controller through the interrupt configuration register, and then the interrupt controller may be controlled to send the interrupt configuration request to the first processor core; and the first processor core may be controlled to configure the interrupt controller based on the interrupt configuration request.

For example, when receiving the interrupt configuration request, the first processor core may be controlled to suspend execution of the running program, and read the interrupt information from the interrupt configuration register. The first processor core may be controlled to determine a register address and a written value of the interrupt controller based on the interrupt information, where the written value indicates the interrupt information. The first processor core may be controlled to write the written value into the register indicated by the register address of the interrupt controller. Then the first processor core may be controlled to continue the execution of the running program.

It should be noted that in this application, the security level of the first physical resource and the security level of the second physical resource are configured in an initialization phase of a system of the chip, by using firmware for initializing the system of the chip. For example, the first physical resource is configured as a first security level identifier, and the second physical resource is configured as a second security level identifier.

In some embodiments, the security isolation apparatus further includes an authentication component. It is assumed that the first physical resource includes the first processor core, and the second physical resource includes the second processor core. The method may further include:

The authentication component is controlled to perform an authentication on an access request initiated by the first processor core of the first subsystem or the second processor core of the second subsystem, and the authentication component is controlled to send the access request to a corresponding peripheral in the chip if the authentication succeeds.

For example, it is assumed that the second physical resource includes the second peripheral. That the authentication component is controlled to perform an authentication on an access request initiated by the first processor core of the first subsystem or the second processor core of the second subsystem, and the authentication component is controlled to send the access request to a corresponding peripheral in the chip if the authentication succeeds includes: the first processor core is controlled to send a first access request to the authentication component, where the first access request carries the first security level identifier and an address of the second peripheral to be accessed; and the authentication component is controlled to obtain a second security level identifier of the second peripheral based on the address of the second peripheral that is carried by the first access request, perform authentication based on the first security level identifier and the second security level identifier, and the authentication component is controlled to forward the first access request to the second peripheral if the authentication succeeds.

That the authentication is performed based on the first security level identifier and the second security level identifier includes:

If a security level of the first processor core corresponding to the first security level identifier is higher than a security level of the second peripheral corresponding to the second security level identifier, the authentication is determined to succeed, where the first access request is a write request or a read request.

For another example, it is assumed that the first physical resource includes a first peripheral. That the authentication component is controlled to perform an authentication on an access request initiated by the first processor core of the first subsystem or the second processor core of the second subsystem, and the authentication component is controlled to send the access request to a corresponding peripheral in the chip if the authentication succeeds includes:

The second processor core is controlled to send a second access request to the authentication component, where the second access request carries the second security level identifier and an address of the first peripheral to be accessed.

The authentication component is controlled to receive the second access request, obtain a first security level identifier of the first peripheral based on the address of the first peripheral that is carried by the second access request, perform authentication based on the first security level identifier and the second security level identifier, and forward the second access request to the first peripheral if the authentication succeeds.

That the authentication is performed based on the first security level identifier and the second security level identifier includes:

If a security level of the second processor core corresponding to the second security level identifier is lower than a security level of the first peripheral corresponding to the first security level identifier, and the second access request is a read request, the authentication is determined to succeed.

For beneficial effects that can be achieved by the security isolation method provided in this application, refer to beneficial effects achieved by the security isolation apparatus provided in this application. Details are not described herein again.

Based on the foregoing descriptions of the security isolation apparatus and the security isolation method provided in this application, the following further describes a process of configuring a security level, a process of performing interrupt configuration in a running phase of a subsystem after the configuration, and a process of triggering an interrupt by a peripheral after the interrupt configuration.

First, how to configure security level identifiers for physical resources in a chip, that is, how to classify security levels of the physical resources in the chip to obtain a plurality of subsystems of different security levels, is described. As shown in FIG. 6, the process may include the following steps.

601: Firmware determines a physical resource in the chip.

The physical resource in the chip may include a processor core, a memory, and an input/output (I/O) device. The I/O device includes an interrupt controller, and may further include a peripheral, that is, an on-chip peripheral mentioned above.

For example, after the chip is powered on, the firmware may first determine each physical resource in the chip, to perform a process of configuring a security level identifier for a physical resource in step 602.

The firmware may be understood as basic firmware, for example, a basic input/output system (BIOS), a unified extensible firmware interface (UEFI), or a Boot Loader which performs software initialization. An initialization process includes a process of determining a physical resource and configuring a security level for a physical resource in a chip. For example, when the chip is powered on and started, the firmware in the chip may configure a security level for the physical resource in the chip after determining the physical resource in the chip. A process of configuring the security level may also be understood as a process of performing physical resource classification.

602: The firmware configures the security level for the physical resource in the chip, to obtain subsystems of at least two security levels, where the security levels of the physical resources included in different subsystems are different. The physical resource includes the only interrupt controller in the chip, and the interrupt controller belongs to a subsystem whose security level is the highest of the at least two security levels.

In some embodiments, the firmware may configure a security level identifier for each physical resource in the chip. Physical resources of different security levels correspond to different security level identifiers.

The foregoing configuration of the security level identifier for the physical resource may also be understood as a process in which the firmware configures security level information for the physical resource, and the security level information includes the security level identifier.

For example, when the chip is powered on and started, the firmware may configure a security level identifier for each processor core of the chip, and the security level identifier may be stored in a register corresponding to the processor core. The firmware may classify memory resources in the chip, different memory areas correspond to different security level identifiers, and the security level identifiers may be stored in a register corresponding to the memory. The firmware configures a security level identifier for each peripheral in the chip, and the security level identifier may be stored in a register corresponding to the peripheral. The interrupt controller is configured to be of the highest security level, and the firmware may write an identifier of the highest security level into a register corresponding to the interrupt controller. In this way, security level configuration for each physical resource is completed.

In this application, there are at least two security levels, and there are also at least two security level identifiers. In this way, subsystems of at least two security levels may be obtained after the security levels are configured. Each subsystem of a security level includes a processor core, a memory area, and a peripheral of the corresponding security level, and a subsystem of the highest security level further includes the interrupt controller.

Figure 7:
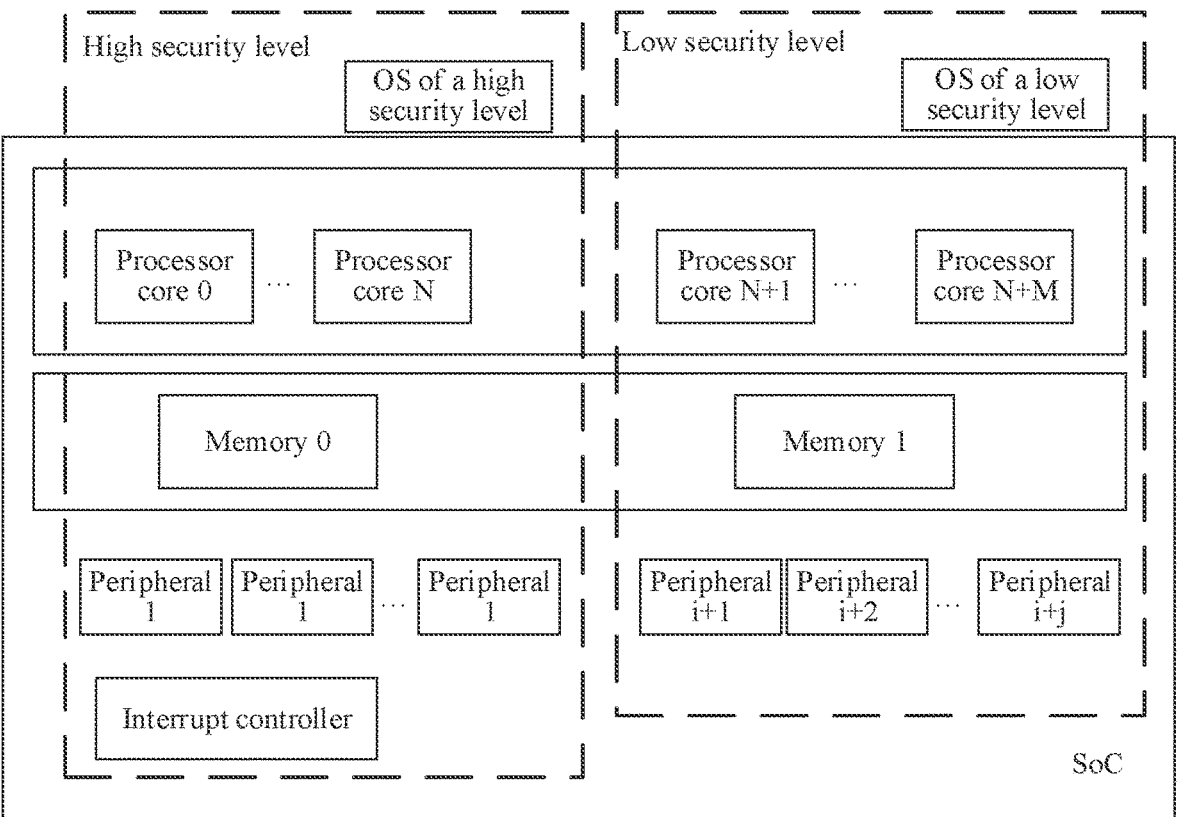
FIG. 7 is a schematic diagram of a subsystem configured with two security levels according to an embodiment of this application.

For example, as shown in FIG. 7, when the security levels configured in the chip may be two security levels, including a high security level and a low security level, the security level identifiers configured by the firmware for the physical resource of the chip includes a high security level identifier and a low security level identifier, where the high security level identifier indicates the high security level, and the low security level identifier indicates the low security level. The high security level identifier is written into a register corresponding to a physical resource of the high security level in the chip, and the low security level identifier is written into a register corresponding to a physical resource of the low security level. In this way, the physical resources in the chip are classified into a subsystem of the high security level and a subsystem of the low security level. FIG. 7 shows a processor core (for example, a processor core 0 and a processor core N), a memory (for example, a memory 0), a peripheral (for example, a peripheral 1, a peripheral 2, and a peripheral i), and an interrupt controller that are included in the subsystem of the high security level, and further shows a processor core (a processor core N+1 and a processor core N+M), a memory (a memory 1), and a peripheral (a peripheral i+1, a peripheral i+2, and a peripheral i+j) that are included in the subsystem of the low security level.

After the subsystems of the two security levels are obtained through classification of the physical resources, the subsystem of the high security level may start and run an OS of the high security level, and the subsystem of the low security level may start and run an OS of the low security level. The OS of the high security level corresponds to a service of the high security level, and the OS of the low security level corresponds to a service of the low security level.

In some embodiments, when configuring a security level identifier for each processor core, the firmware may further configure a lock-step mode for a processor core of the highest security level. In the lock-step mode, a lock-step core technology may be used for the processor core of the highest security level. The lock-step core technology can maintain precise synchronization between a plurality of processor cores and memories, and execute a same instruction in a same clock cycle. This ensures that the subsystem of the high security level can detect any error. Even if a temporary error occurs, the subsystem can recover to normal operation without interrupt or data loss. Specifically, an implementation of the lock-step core may include: A same program is run by two processor cores in a subsystem of the highest security level (which may also be understood as that one instruction is run by two processor cores), to obtain output results from the two processor cores. The output results from the two processor cores are input into one comparison logic, to compare whether the output results from the two processor cores are the same. If they are the same, the subsystem of the highest security level continues to run; otherwise, the comparison logic returns an error indication. The subsystem needs to take some measures, for example, the two processor cores re-run codes that generate different output results, and compare and check results after the re-run, or restart the network device. It can be learned that although two processor cores are used in the lock-step core, only one processor core is actually used.

In some embodiments, when classifying security levels for memory resources in a chip, the firmware may further configure a memory in a subsystem of the highest security level to be in a mirror mode. The mirror mode may be understood as obtaining two copies of data to be stored in the memory, and storing the two copies in the main memory area and the mirror memory area respectively. In normal cases, when the subsystem needs to read data from the memory, the subsystem reads the data only from the main memory area. The subsystem reads data from the mirror memory area only when the main memory area is faulty and cannot be recovered through the memory protection and Chipkill technologies. If there is a fault in the main memory area that results a subsystem alarm, the subsystem reports the fault to the system administrator. At the same time, the chip automatically turns to use the mirror memory area, until a memory card in the faulty main memory area is replaced. In this way, interruption caused by a fault in the main memory area can be avoided, thereby ensuring stable running of the subsystem. For the two memory areas in the mirror mode, only one memory area is used, and the other memory area is used as a backup. Therefore, for the subsystem, only half of the capacity of the entire memory area of the subsystem is available.

According to the foregoing description, it may be understood that, in this application, security levels are configured for physical resources in a single chip, so that subsystems of at least two security levels can be obtained. That is, in one chip, inter-system isolation may be performed in a manner of physical resource classification. A problem in the conventional technology that virtual CPUs of different subsystems may run in one physical processor core and result in incomplete isolation between different guest OSs can be avoided. Problems of complex implementation and high costs caused by implementing inter-system isolation using two chip architectures can be also avoided. In addition, in this application, the interrupt controller is classified into the subsystem of the highest security level. When the subsystem of the low security level needs to configure the interrupt controller, the subsystem can only request configuration from the subsystem of the high security level. In this way, it can be ensured that the security level of the interrupt controller is higher, and security of executing the interrupt by a single chip is higher.

Figure 8:
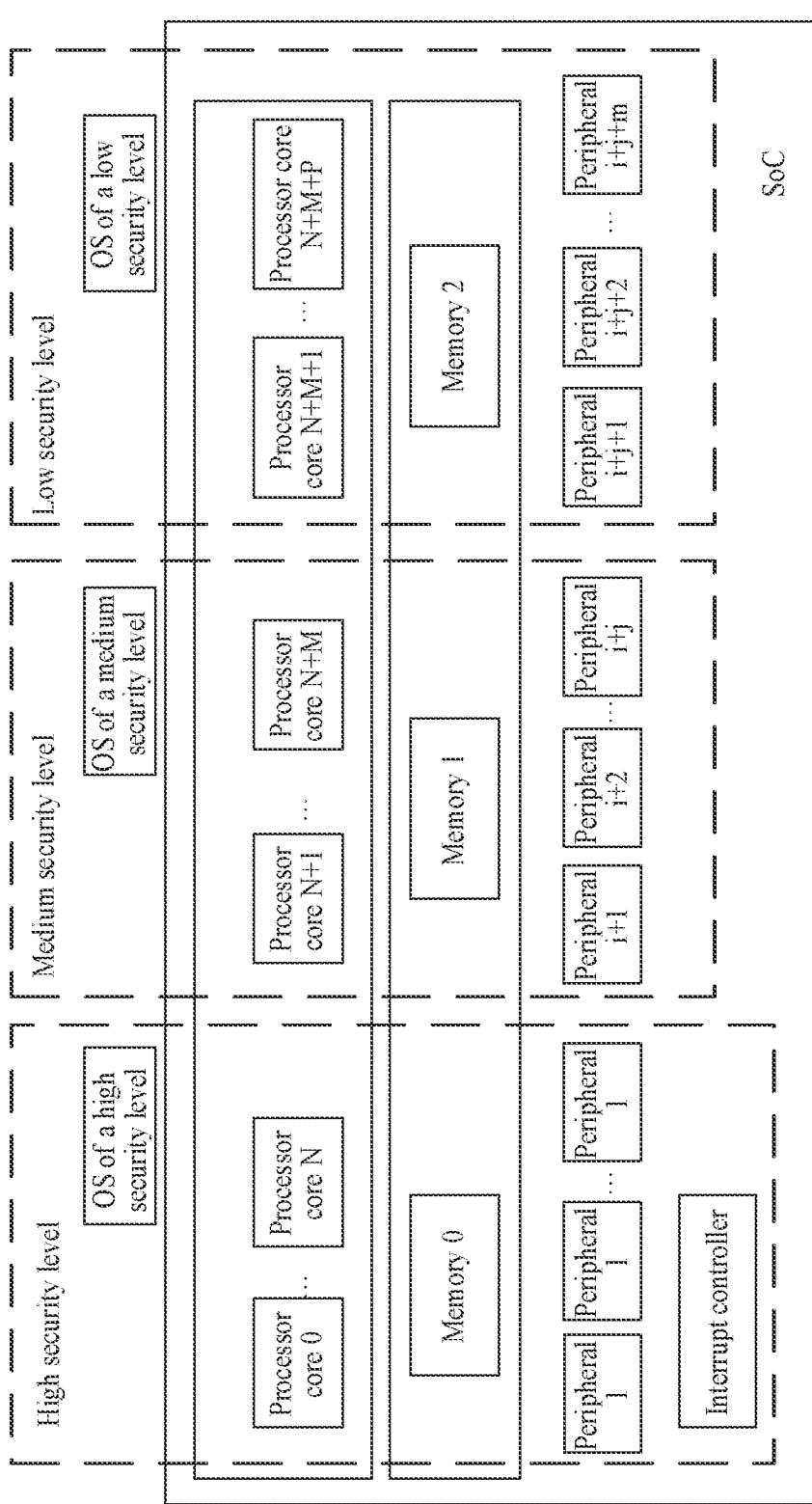
FIG. 8 is a schematic diagram of a subsystem configured with three security levels according to an embodiment of this application.

In some embodiments, based on the example of FIG. 7 in which two security levels are configured, it may be understood that this application may be further extended to more than two security levels. As shown in FIG. 8, when the security levels in the chip are three security levels, including a high security level, a medium security level, and a low security level, the security level identifiers configured by the firmware for the physical resource of the chip includes a high security level identifier, a medium security level identifier, and a low security level identifier, where the high security level identifier indicates the high security level, the medium security level identifier indicates the medium security level, and the low security level identifier indicates the low security level. The security levels are as follows: the high security level is higher than the medium security level, and the medium security level is higher than the low security level. Based on the example chip of FIG. 7, the medium security level identifier is written into a register corresponding to a physical resource of the medium security level in the chip. In this way, the physical resources in the chip are classified into a subsystem of the high security level, a subsystem of the medium security level, and a subsystem of the low security level.

FIG. 8 shows a processor core (for example, a processor core 0 and a processor core N), a memory (memory 0), a peripheral (peripheral 1, peripheral 2, and peripheral i), and an interrupt controller that are included in the subsystem of the high security level, further shows a processor core (processor core N+1 and processor core N+M), a memory (memory 1), and a peripheral (peripheral i+1, peripheral i+2, and peripheral i+j) that are included in the subsystem of the medium security level, and further shows a processor core (a processor core N+M+1 and a processor core N+M+P), a memory (a memory 2), and a peripheral (a peripheral i+j+1, a peripheral i+j+2, and a peripheral i+j+m) that are included in the subsystem of the low security level.

When there are subsystems of three security levels, the interrupt controller still belongs to the subsystem of the security level whose security level is the highest among the subsystems of the three security levels. When the subsystem of the medium security level or the subsystem of the low security level needs to perform interrupt configuration, the subsystem of the medium security level or the subsystem of the low security level needs to request interrupt configuration from the subsystem of the high security level.

According to the foregoing description, it may be understood that in this application, there is only one interrupt controller in a single chip, and a security level of the interrupt controller is the highest security level. The interrupt controller can manage interrupts of all peripherals in the chip. Therefore, subsystems of all security levels need to access the interrupt controller to control the interrupts of the peripherals of the subsystem. However, because the interrupt controller belongs to a physical resource of the highest security level, only the physical resource of the highest security level can directly perform write access to the interrupt controller, and physical resources of other security levels can only perform read access to the interrupt controller. In addition, write access to the interrupt controller by other subsystems that are not of the highest security level can be performed only with the assistance of the subsystem of the highest security level. That is, an interrupt configuration process can be configured only by the subsystem of the highest security level.

In addition, after the security level identifiers are configured for all physical resources in the chip, and the physical resources of the entire chip are classified to obtain subsystems of the at least two security levels, the firmware may start an OS corresponding to respective subsystem, to run a service corresponding to respective subsystem. Therefore, the method may further include the following steps.

603: The firmware controls a subsystem of each security level to start a corresponding OS, to start to run a service of the subsystem of each security level.

Using an example corresponding to FIG. 7 as an example, the firmware may control the subsystem of the high security level to start an OS and run the service of the high security level, and control the subsystem of the low security level to start an OS and run the service of the low security level. For example, the service of the high security level herein includes a service of a security level of ASIL-D, and the service of the low security level includes a service of a security level of ASIL-B or a service of a security level of QM.

After the OS of each subsystem is started, the subsystems can access to each other. To ensure security of the subsystem of the high security level, in this application, the subsystem of the low security level may perform read access, but not write access, to a sub-area of the high security level; and the subsystem of the high security level may perform read access and write access to the subsystem of the low security level. It may be understood that, in the example shown in FIG. 8, the subsystem of the high security level may perform read access and write access to the subsystem of the medium security level and the subsystem of the low security level, but the subsystem of the medium security level and the subsystem of the low security level can perform read access only, but not write access, to the subsystem of the high security level. Therefore, the method may further include the following steps.

604: When the first processor core is about to access the first peripheral, the authentication component determines, based on the security level identifier of the first processor core and the security level identifier of the first peripheral, whether to respond to the access request of the first processor core.

According to the authentication principle of the authentication component mentioned above: when the security level of the first processor core is higher than or equal to the security level of the first peripheral, the authentication component determines to respond to the access request of the first processor, that is, the first processor core of the high security level may access the first peripheral of the low security level, where the access includes write access and read access; and when the security level of the first processor core is lower than the security level of the first peripheral, if the access request is read access, the authentication component determines to respond to the read access; or if the access request is write access, the authentication component determines that the write access is invalid, that is, the first processor core of the low security level can only perform read access, but not write access, to the first peripheral of the high security level.

Figure 9:
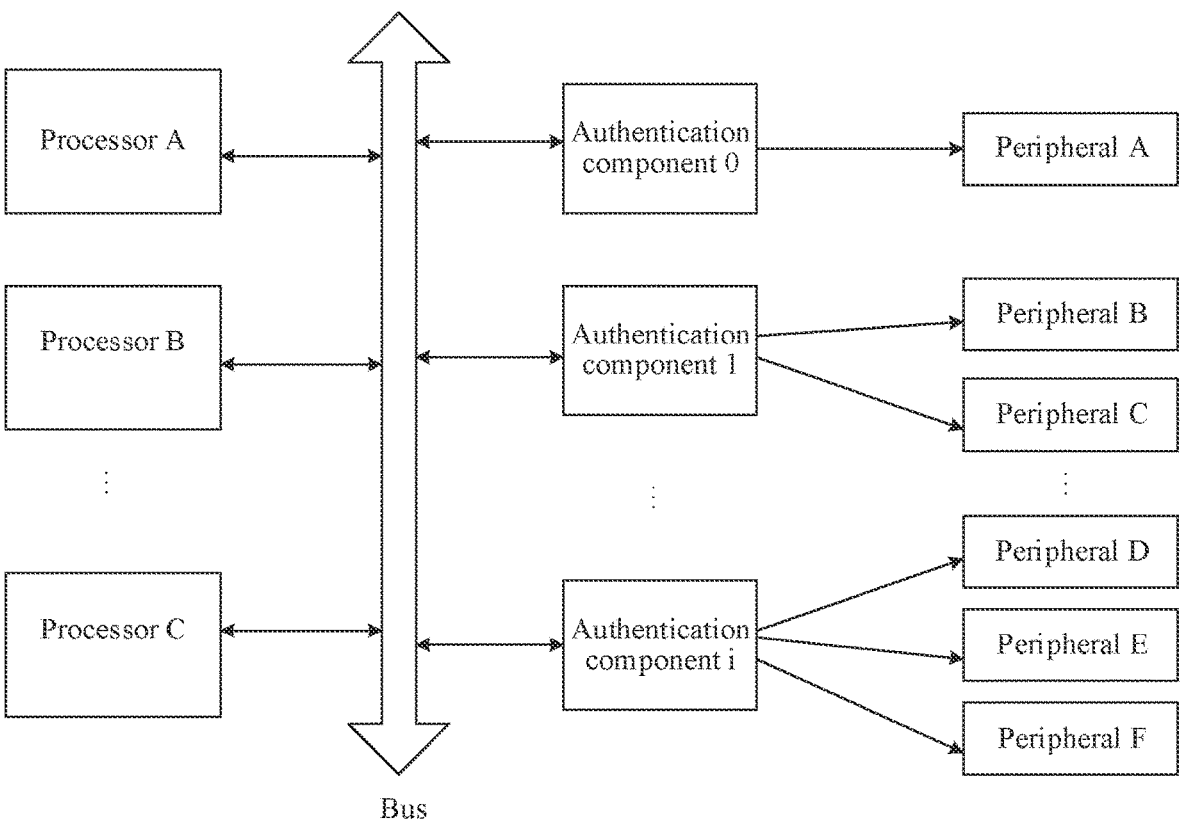
FIG. 9 is a schematic diagram illustrating authentication, by an authentication component, on mutual access between different subsystems according to an embodiment of this application.

For example, refer to FIG. 9. The peripheral of each subsystem has a corresponding authentication component. When a processor core of a subsystem wants to access a peripheral of another subsystem, the authentication component corresponding to the peripheral may determine, according to the foregoing access principle, whether the processor core can access the peripheral. Refer to FIG. 9. It is assumed that a processor core A needs to access a peripheral B, and the processor core A sends an access request. The access request reaches an authentication component 0 via a bus in a chip, and the access request carries a security level identifier corresponding to the processor core A and an address of the peripheral B to be accessed. When receiving the access request, the authentication component 0 extracts the security level identifier of the processor core A in the access request, reads a security level identifier corresponding to the peripheral B based on the address of the peripheral B, and then performs authentication according to the foregoing authentication principle, to determine whether the processor core A can access the peripheral B. If it is determined that the processor core A can access the peripheral B, the authentication component 0 sends the access request to the peripheral B for processing; or if it is determined that the processor core A cannot access the peripheral B, the authentication component 0 returns an access rejection indication to the processor core A, and the access request ends.

In this way, under the authentication principle followed by the authentication component, security of the subsystem of the high security level can be ensured.

In addition, after the OSs of respective subsystem are started to run, not only the subsystems may access each other through the authentication component, but also the subsystem of the low security level may request the subsystem of the high security level that includes the interrupt controller for interrupt configuration, that is, only the subsystem of the high security level may perform write access to the interrupt controller.

It is assumed that the subsystems of different security levels include a first subsystem and a second subsystem, and the first subsystem is a subsystem of the highest security level, that is, a first physical resource of the first subsystem includes an interrupt controller. A process in which the second subsystem requests for interrupt configuration may include the following steps.

The second subsystem sends an interrupt configuration request to the first subsystem.

The first subsystem executes interrupt configuration for the second subsystem based on the interrupt configuration request.

It may be understood that the second subsystem may be the subsystem of the low security level shown in FIG. 7 or FIG. 8, or may be the subsystem of the medium security level shown in FIG. 8. When the second subsystem needs to perform interrupt configuration in the interrupt controller, the second subsystem may send the interrupt configuration request to the first subsystem, so that the first subsystem assists to configure the interrupt. That is, the first subsystem performs a write operation on the interrupt controller. In this way, after the interrupt configuration is completed, when interrupt needs to be generated for a peripheral of the second subsystem subsequently, the peripheral of the second subsystem may send an interrupt signal to the interrupt controller. The interrupt controller may send the interrupt signal to the processor core. The processor core may suspend execution of a running program and execute an interrupt program indicated by the interrupt signal.

The following further describes a process in which the second subsystem requests for interrupt configuration. The process may include the following steps.

11: The first subsystem configures an interrupt route in the interrupt controller.

This process may be understood as that, configuring, in the interrupt controller, a processor core of the subsystem of the high security level to perform interrupt configuration for a peripheral of the subsystem of the non-high security level. When the subsystem of the high security level determines that the processor core B in the subsystem of the high security level performs interrupt configuration for the peripheral A, the subsystem of the high security level may perform a write operation on the interrupt controller, where the write operation indicates the processor core B to perform the interrupt configuration operation when the interrupt controller determines that an interrupt needs to be configured for the peripheral A.

Step 11 is equivalent to making preparations before the first subsystem assists the second subsystem in configuring the interrupt controller.

12: The processor core of the second subsystem writes the interrupt information into the interrupt configuration register of the second subsystem.

Figure 10:
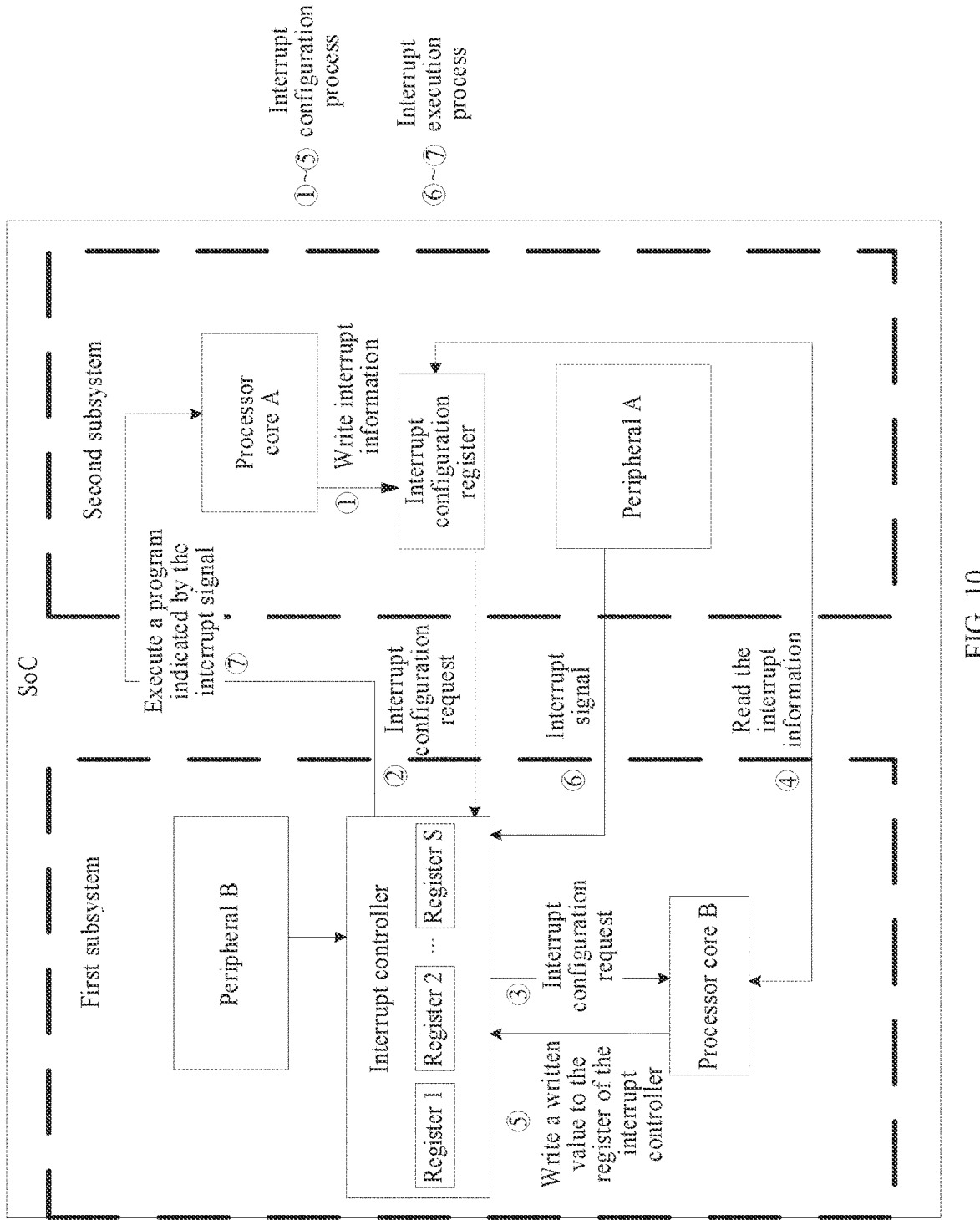
FIG. 10 is a schematic diagram of a process in which a second subsystem requests for an interrupt configuration and triggers an interrupt according to an embodiment of this application.

For example, as shown in FIG. 10, the interrupt configuration register may be a Mailbox. When the processor core A of the second subsystem needs to configure an interrupt for the peripheral A in the interrupt controller, the processor core A may write interrupt information of the interrupt to be configured for the peripheral A to the Mailbox of the second subsystem. The interrupt information may include an interrupt number, an interrupt attribute, and an interrupt attribute value. This step is equivalent to step ① in FIG. 10.

One interrupt number corresponds to one peripheral, and one peripheral may correspond to a plurality of interrupt attributes. The interrupt attributes may include an interrupt priority, an interrupt triggering manner, interrupt enabled information, and the like. The interrupt attribute value is an interrupt priority value, an interrupt triggering manner value, an interrupt enabled information value, and the like.

13: The processor core of the first subsystem obtains the interrupt configuration request from the interrupt configuration register.

For example, refer to FIG. 10. The processor core B of the first subsystem may obtain an interrupt configuration request from the interrupt configuration register through the interrupt controller. The process is equivalent to steps ② and ③ in FIG. 10. The interrupt configuration request requests to perform interrupt configuration for the peripheral A.

Alternatively, the processor core A of the second subsystem may generate the interrupt configuration request based on the interrupt information, and send the interrupt configuration request to the interrupt controller through the Mailbox. This process is equivalent to step ② in FIG. 10. When receiving the interrupt configuration request from the Mailbox, the interrupt controller may send the interrupt configuration request to the processor core B of the first subsystem based on the interrupt route configured in step 11. This process is equivalent to step ③ in FIG. 10.

14: The processor core of the first subsystem suspends execution of the running program, reads the interrupt information from the interrupt configuration register, determines a register address and a written value of the interrupt controller based on the interrupt information, where the written value indicates the interrupt information; and writes the written value into the register indicated by the register address of the interrupt controller.

For example, refer to FIG. 10. When the processor core B receives the interrupt configuration request sent by the interrupt controller, the processor core B suspends execution of the running program, and reads the interrupt information of the peripheral A in the Mailbox through hardware resources such as the bus and the authentication component, including information such as the interrupt number, the interrupt attribute, and the attribute value. The process is equivalent to step ④ in FIG. 10. Then, the processor core B may determine, based on the interrupt information, which register of the interrupt controller is configured with the interrupt and the configuration information to be written when the interrupt controller is configured this time. That is, the processor core B determines, based on the interrupt information, the register address of the interrupt controller and the written value to be written to the register of the interrupt controller. When the register address of the interrupt controller is determined, the processor core B may write the written value into the register indicated by the register address of the interrupt controller. This process is equivalent to step ⑤ in FIG. 10.

15: The processor core of the first subsystem continues to execute the running program.

After the processor of the first subsystem writes the written value into the register of the interrupt controller, it means that the interrupt configuration process ends. The processor core B of the first subsystem may continue to execute the running program that is interrupted in step 14.

In some embodiments, the processor core A of the second subsystem may further determine, by reading a newly written value in the register of the interrupt controller, whether the interrupt configuration process is completed this time. If the written value matches the attribute value of the interrupt to be configured by the second subsystem, the processor core A of the second subsystem determines that the interrupt configuration process is completed.

Alternatively, after the processor core B of the first subsystem writes the written value to the register of the interrupt controller, the processor core B of the first subsystem may send a response message to the processor core A of the second subsystem, where the response message indicates that the interrupt configuration for the peripheral A is completed. After the processor core A of the second subsystem receives the response message, the processor core A may read the written value in the register of the interrupt controller, to determine whether the written value matches the attribute value of the to-be-configured interrupt.

It should be noted that one peripheral may correspond to a plurality of interrupt attributes. Steps 12 to 15 are a process of configuring one interrupt attribute of one peripheral. For a configuration manner of a plurality of interrupt attributes of one peripheral, refer to the configuration process of steps 12 to 15. After the interrupt of the peripheral is completed based on the configuration process, if an interrupt is generated for the peripheral, the interrupt controller can correctly process the interrupt. For example, an interrupt N of the peripheral A is configured in the interrupt controller. Once the peripheral A requests the interrupt controller to perform an operation of the interrupt N, the interrupt controller may determine, based on the priority of the interrupt N configured in the register, whether interrupt preemption occurs and whether to run the processor core to process the interrupt N.

Therefore, after the foregoing process of configuring the interrupt controller is completed, and after step 15, if the peripheral of the second subsystem triggers the interrupt, a process of operation of the interrupt controller may include the following steps.

16: The peripheral of the second subsystem sends an interrupt signal to the interrupt controller.

Based on that interrupt configuration is performed for the peripheral of the second subsystem, if the peripheral of the second subsystem needs to trigger the interrupt, the peripheral of the second subsystem may send the interrupt signal to the interrupt controller, to indicate that the peripheral needs to trigger the interrupt. For example, refer to FIG. 10. The peripheral A of the second subsystem sends an interrupt signal to the interrupt controller. This process is equivalent to step in FIG. 10.

It may be understood that the apparatus in which the interrupt controller is located has a plurality of pins, and each pin is connected to a peripheral. When a level of a pin changes, it may be understood that the pin receives an interrupt signal of the peripheral, and the interrupt controller determines that the peripheral needs to trigger the interrupt.

17: The interrupt controller sends the interrupt signal to the processor core of the second subsystem or the processor core of the first subsystem, so that the processor core of the second subsystem or the processor core of the first subsystem suspends the running program and executes the program indicated by the interrupt signal.

Refer to FIG. 10. When the interrupt controller receives the interrupt signal, if the interrupt controller determines that an interrupt attribute corresponding to the interrupt signal has been configured in the interrupt controller, and the interrupt can be triggered, the interrupt controller may determine, based on information such as an interrupt priority, whether to perform preemption processing, whether to run the processor core to process the interrupt, and the like. If the interrupt controller determines that the processor core can be run to process the interrupt, in one manner, the interrupt controller sends the interrupt signal to the processor core of the second subsystem through an interface communicating with the processor core of the second subsystem. For example, in step ⑦ shown in FIG. 10, the interrupt controller indicates the processor core A to execute a program corresponding to the interrupt signal. When the processor core A receives the interrupt signal from the interrupt controller, the processor core A suspends the running program and executes the program indicated by the interrupt signal. In another manner, the interrupt controller may send the interrupt signal to a processor core of the first subsystem, to indicate the processor core of the first subsystem to execute the program indicated by the interrupt signal.

The foregoing describes a process in which the subsystem of the low security level requests to configure the interrupt. The following describes a process in which the subsystem of the high security level (of the highest security level) configures the interrupt controller. The process may include (not shown) the following steps.

81: The processor core of the first subsystem executes interrupt configuration for the interrupt controller.

Refer to FIG. 10. For example, before the first subsystem uses the peripheral B to perform an interrupt, the first subsystem first needs to perform interrupt configuration for the interrupt of the peripheral B. For example, specifically, the processor core B of the first subsystem may directly perform the write operation on the register of the interrupt controller, where the write operation configures the interrupt priority attribute, the route attribute, an enable attribute, and the like for the peripheral B.

The step 81 is a process of configuring the interrupt controller for the subsystem of the high security level. Then, if the peripheral of the subsystem of the high security level generates the interrupt, the method further includes the following steps.

82: The peripheral of the first subsystem sends the interrupt signal to the interrupt controller.

For example, refer to FIG. 10. When an interrupt is generated for the peripheral B, the peripheral B may send an interrupt signal to the interrupt controller.

83: The interrupt controller sends an interrupt signal to the processor core of the first subsystem or the processor core of the second subsystem, to trigger the processor core to suspend the running program and execute the program indicated by the interrupt signal.

For example, refer to FIG. 10. If the interrupt controller determines that the interrupt controller has performed interrupt configuration on the peripheral B, the interrupt controller may send, based on the configured interrupt routing information, the interrupt signal to the processor core that processes the interrupt.

The interrupt controller may send the interrupt signal to the processor core B of the first subsystem based on the interrupt routing information. When receiving the interrupt signal, the processor core B may suspend the running program and execute the program corresponding to the interrupt signal. After the program execution is completed, the processor core B resumes the running program that is previously suspended.

Alternatively, the interrupt controller may send the interrupt signal to the processor core A of the second subsystem based on the interrupt routing information. When receiving the interrupt signal, the processor core A suspends the running program and executes the program corresponding to the interrupt signal. After the program execution is completed, the processor core A resumes the running program that is previously suspended.

In this way, in this application, security levels of physical resources are classified in a single chip, so that the single chip can have subsystems of a plurality of security levels, thereby ensuring security of a subsystem of a high security level. In addition, in this application, when the security level of the interrupt controller is set to the high security level, that only a subsystem of the high security level can read and write the interrupt controller, or that only a subsystem of the high security level can configure the interrupt controller may be implemented. The subsystem of a non-high security level can only read the interrupt controller. If the subsystem of the non-high security level needs to configure the interrupt controller, the interrupt configuration can be performed only with the assistance of the subsystem of the highest security level. In this way, the subsystem of the non-high security level cannot randomly perform write access to the interrupt controller, so that security of the interrupt controller can be ensured, and security of the entire system of the single chip is improved.

It should be noted that when the high security level in this application is ASIL-D, the low security level may be ASIL-C, ASIL-B, ASIL-A, or the like, or the low security level is QM of a non-security level.

Alternatively, when the high security level in this application is ASIL-C, the low security level may be ASIL-B or ASIL-A, or the low security level is QM.

Alternatively, when the high security level in this application is ASIL-B, the low security level may be ASIL-A, or the low security level is QM.

Alternatively, when the high security level in this application is ASIL-A, the low security level may be QM.

It should be noted that, in this application, in addition to using a Mailbox as an interrupt configuration register to implement interrupt configuration communication between subsystems of different security levels, a doorbell+shared memory may also be used for implementation. When the doorbell in the subsystem of the low security level requests to configure an interrupt, the subsystem of the high security level may read interrupt information from shared memory of the subsystem of the high security level and the subsystem of the low security level. The subsystem of the high security level determines, based on the interrupt information, an address and a written value of a register for configuring the interrupt controller, to write the written value to the register based on the address of the register. The interrupt configuration operation is completed. It may be understood that any implementation in which the interrupt configuration request is sent to the subsystem of the high security level in an interrupt manner may be applied to this application.

In this application, if the subsystem of the low security level has only one service, only one guest OS needs to be run in the subsystem of the low security level. If the subsystem of the low security level has a plurality of services that need to be processed, a plurality of guest OSs may be started through the Hypervisor to separately process different services.

In addition, it is described above in this application that a security level may be configured through firmware (for example, UEFI), to implement physical resource classification. Alternatively, a resource classification configuration may be fixed through hardware. That is, a security level of a physical resource is fixed during hardware stream slicing, so that a software configuration process can be omitted.

An embodiment of this application provides a communication apparatus. The communication apparatus may be a chip, and the chip may include the security isolation apparatus according to this application.

An embodiment of this application further provides a control system. The control system may be, for example, the MDC system. The control system includes a chip, and the chip may include the security isolation apparatus according to this application.

An embodiment of this application further provides a computer-readable storage medium, including computer instructions. The computer instruction, when run on an electronic device, enable the electronic device to perform the security isolation method according to this application.

An embodiment of this application further provides a computer program product. The computer program product, when run on a computer, enable an electronic device to perform the security isolation method according to this application.

An embodiment of this application further provides a terminal device. The terminal device includes the security isolation apparatus according to this application.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for indicating a device (which may be a single-chip microcomputer, a chip or the like) or a processor to perform all or some of the steps of the methods described in embodiments of this application. The foregoing storage medium includes any medium that can store program code, for example, a Universal Serial Bus (USB) flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A security isolation apparatus, comprising:
a chip comprising:
  a second subsystem comprising a second processor core, a first peripheral, and a second physical resource, wherein the second physical resource has a second security level; and
  a first subsystem comprising:
    a first processor core;
    a first physical resource, wherein the first physical resource has a first security level, and wherein the first security level is higher than the second security level; and
    an interrupt controller configured to:
      receive an interrupt signal from the first peripheral of the second subsystem; and
      control, when receiving the interrupt signal, the first processor core or the second processor core to suspend a running program and to execute a program from the interrupt signal.

2. The security isolation apparatus of claim 1, wherein the first peripheral comprises a second peripheral, and wherein the second peripheral is configured to send the interrupt signal to the interrupt controller.

3. The security isolation apparatus of claim 2, wherein the second physical resource comprises:
an interrupt configuration register; and
a third processor core configured to write interrupt information into the interrupt configuration register, wherein the interrupt information comprises an interrupt attribute of the interrupt signal, and
wherein the first physical resource comprises a fourth processor core configured to:
  read the interrupt information from the interrupt configuration register; and
  configure the interrupt information in the interrupt controller to enable the interrupt controller to control the first processor core or the second processor core to execute the program.

4. The security isolation apparatus of claim 3, wherein the fourth processor core is further configured to obtain an interrupt configuration request from the interrupt configuration register to trigger the fourth processor core to read the interrupt information.

5. The security isolation apparatus of claim 1, wherein the first physical resource is configured as a first security level identifier, and wherein the second physical resource is configured as a second security level identifier.

6. The security isolation apparatus of claim 5, wherein the first physical resource comprises a first processor core, wherein the first processor core is configured to send a first access request carrying the first security level identifier and an address of a second peripheral to be accessed, wherein the second physical resource comprises a second processor core and the second peripheral, wherein the security isolation apparatus further comprises an authentication circuit configured to:
receive the first access request;

obtain a third security level identifier of the second peripheral based on the address;
perform authentication based on the first security level identifier and the third security level identifier; and
forward the first access request to the second peripheral when the authentication succeeds.

7. The security isolation apparatus of claim 6, wherein the authentication circuit device is further configured to determine, when a third security level of the first processor core corresponding to the first security level identifier is higher than a fourth security level of the second peripheral corresponding to the third security level identifier, that the authentication succeeds, and wherein the first access request is a write request or a read request.

8. The security isolation apparatus of claim 5, wherein the first physical resource comprises a first processor core and a second peripheral, wherein the second physical resource comprises a second processor core, wherein the second processor core is configured to send a second access request carrying the second security level identifier and an address of the second peripheral to be accessed, wherein the security isolation apparatus further comprises an authentication circuit configured to:
receive the second access request;
obtain a third security level identifier of the second peripheral based on the address;
perform authentication based on the third security level identifier and the second security level identifier; and
forward the second access request to the second peripheral when the authentication succeeds.

9. The security isolation apparatus of claim 8, wherein the authentication circuit is further configured to determine, when a third security level of the second processor core corresponding to the second security level identifier is lower than a fourth security level of the second peripheral corresponding to the third security level identifier and when the second access request is a read request, that the authentication succeeds.

10. The security isolation apparatus of claim 1, wherein the first subsystem is configured to process a first service of the first security level, wherein the second subsystem is configured to process a second service of the second security level or a third service of a non-security level, wherein the first security level and the second security level are levels in an automotive safety integration level (ASIL), and wherein the non-security level is quality management (QM).

11. A method comprising,
providing a first subsystem and a second subsystem of a security isolation apparatus, wherein the first subsystem and the second subsystem are comprised in a same chip, wherein the first subsystem comprises a first processor core, an interrupt controller and a first physical resource having a first security level, wherein the second subsystem comprises a second processor core, a first peripheral, and a second physical resource having a second security level, and wherein the first security level is higher than the second security level;
receiving, by the interrupt controller, an interrupt signal from the first peripheral of the second subsystem; and
controlling, by the interrupt controller when receiving the interrupt signal, the first processor core or the second processor core to suspend a running program and execute a program from the interrupt signal.

12. The method of claim 11, wherein the second subsystem further comprises a second peripheral, and wherein the method further comprises sending, by the second peripheral, an interrupt signal to the interrupt controller.

13. The method of claim 12, wherein the second physical resource comprises an interrupt configuration register and a third processor core, wherein the first physical resource comprises a fourth processor core, and wherein before sending the interrupt signal, the method further comprises:

writing, by the third processor core, interrupt information into the interrupt configuration register, wherein the interrupt information comprises an interrupt attribute of the interrupt signal from the second peripheral;

reading, by the fourth processor core, the interrupt information from the interrupt configuration register; and configuring, by the fourth processor core, the interrupt information in the interrupt controller to enable the interrupt controller to control the first processor core or the second processor core to execute the program from the second peripheral.

14. The method of claim 13, wherein reading the interrupt information comprises obtaining, by the first processor core, an interrupt configuration request from the interrupt configuration register to trigger the first processor core to read the interrupt information.

15. The method of claim 11, wherein the first security level and the second security level are comprised in an initialization phase of a system using firmware.

16. The method of claim 11, wherein the first physical resource comprises a first security level identifier, and wherein the second physical resource comprises a second security level identifier.

17. The method of claim 16, wherein the first physical resource comprises a first processor core, wherein the second physical resource comprises a second peripheral, and wherein the method further comprises:

sending, by the first processor core, a first access request to an authentication circuit of the security isolation apparatus, wherein the first access request carries the first security level identifier and an address of the second peripheral to be accessed;

obtaining, by the authentication circuit, a third security level identifier of the second peripheral based on the address;

performing, by the authentication circuit, authentication based on the first security level identifier and the third security level identifier, and forwarding, by the authentication circuit, the first access request to the second peripheral when the authentication succeeds.

18. The method of claim 17, wherein performing the authentication comprises determining, when a third security level of the first processor core corresponding to the first security level identifier is higher than a fourth security level of the second peripheral corresponding to the third security level identifier, that the authentication succeeds, and wherein the first access request is a write request or a read request.

19. The method of claim 16, wherein the first physical resource comprises a first processor core and a first peripheral, wherein the second physical resource comprises a second processor core, and wherein the method further comprises:

sending, by the second processor core, a second access request to an authentication circuit of the security isolation apparatus, wherein the second access request carries the second security level identifier and an address of the first peripheral to be accessed;

receiving, by the authentication circuit, the second access request;

obtaining, by the authentication circuit, a third security level identifier of the first peripheral based on the address;

performing authentication based on the third security level identifier and the second security level identifier; and forwarding the second access request to the first peripheral when the authentication succeeds.

20. A chip comprising:

a second subsystem comprising a second processor core, a first peripheral, and a second physical resource, wherein the second physical resource has a second security level; and a first subsystem comprising:

a first processor core;

a first physical resource, wherein the first physical resource has a first security level, and wherein the first security level is higher than the second security level; and an interrupt controller configured to:

receive an interrupt signal from the first peripheral of the second subsystem; and control, when receiving an interrupt signal, the first processor core or the second processor core to suspend a running program and to execute a program from the interrupt signal.

* * * * *